US012473654B2

(12) United States Patent
Hallack et al.

(10) Patent No.: US 12,473,654 B2
(45) Date of Patent: Nov. 18, 2025

(54) USE OF SILICON DIOXIDE FOR IMPROVING THE CATHODIC ANTICORROSION EFFECT OF GROUND COATS

(71) Applicant: Evonik Operations GmbH, Essen (DE)

(72) Inventors: Markus Hallack, Schermbeck (DE); Berend-Jan de Gans, Muelheim an der Ruhr (DE); Florian Düllmann, Hagen (DE); Sascha Herrwerth, Freigericht (DE)

(73) Assignee: Evonik Operations GmbH, Essen (DE)

(*) Notice: Subject to any disclaimer, the term of this patent is extended or adjusted under 35 U.S.C. 154(b) by 1024 days.

(21) Appl. No.: 17/399,171

(22) Filed: Aug. 11, 2021

(65) Prior Publication Data
US 2022/0049362 A1 Feb. 17, 2022

(30) Foreign Application Priority Data

Aug. 12, 2020 (EP) .................................. 20190611

(51) Int. Cl.
| C23F 11/18 | (2006.01) |
| C08K 3/08 | (2006.01) |
| C08K 3/36 | (2006.01) |
| C08K 9/06 | (2006.01) |
| C09D 5/08 | (2006.01) |
| C09D 5/10 | (2006.01) |
| C09D 7/61 | (2018.01) |
| C09D 7/62 | (2018.01) |
| C09D 163/00 | (2006.01) |
| C09G 1/00 | (2006.01) |

(52) U.S. Cl.
CPC ............... *C23F 11/18* (2013.01); *C08K 3/36* (2013.01); *C08K 9/06* (2013.01); *C09D 5/084* (2013.01); *C09D 5/10* (2013.01); *C09D 5/106* (2013.01); *C09D 7/61* (2018.01); *C09D 7/62* (2018.01); *C09D 163/00* (2013.01); *C09G 1/00* (2013.01); C08K 2003/0893 (2013.01); C08K 2201/006 (2013.01)

(58) Field of Classification Search
CPC .. C23F 11/18; C09D 7/61; C09D 7/62; C09D 5/084; C09D 5/106; C09D 163/00; C09D 5/10; C09G 1/00; C08K 3/36; C08K 9/06; C08K 2003/0893; C08K 2201/006
See application file for complete search history.

(56) References Cited

U.S. PATENT DOCUMENTS

| 3,423,361 | A | 1/1969 | Kotzsch et al. |
| 3,423,362 | A | 1/1969 | Kötzsch et al. |
| 3,446,774 | A | 5/1969 | Kotzsch et al. |
| 3,557,179 | A | 1/1971 | Lenz et al. |
| 3,627,807 | A | 12/1971 | Bleh et al. |
| 3,679,724 | A | 7/1972 | Termin et al. |
| 3,850,971 | A | 11/1974 | Termin et al. |
| 3,948,964 | A | 4/1976 | Barfurth et al. |
| 3,957,718 | A | 5/1976 | Pochert et al. |
| 4,006,175 | A | 2/1977 | Termin et al. |
| 4,026,827 | A | 5/1977 | Steffen |
| 4,028,218 | A | 6/1977 | Fink et al. |
| 4,051,228 | A | 9/1977 | Knorre et al. |
| 4,065,401 | A * | 12/1977 | Cohnen ...................... C08J 9/08 516/11 |
| 4,083,872 | A | 4/1978 | Schwarze et al. |
| 4,094,771 | A | 6/1978 | Brandt et al. |
| 4,107,274 | A | 8/1978 | Knorre et al. |
| 4,113,761 | A | 9/1978 | Kreuzburg et al. |
| 4,150,101 | A | 4/1979 | Schmidt et al. |
| 4,151,156 | A * | 4/1979 | Itoh ........................... C08K 3/22 524/847 |
| 4,178,351 | A | 12/1979 | Klebe et al. |
| 4,179,431 | A | 12/1979 | Kilian et al. |
| 4,185,029 | A | 1/1980 | Kreuzburg et al. |
| 4,190,632 | A | 2/1980 | Achenbach et al. |
| 4,197,252 | A | 4/1980 | Joch et al. |
| 4,208,213 | A | 6/1980 | Müller et al. |
| 4,208,316 | A | 6/1980 | Nauroth et al. |
| 4,224,234 | A | 9/1980 | Flick et al. |
| 4,224,295 | A | 9/1980 | Brandt et al. |
| 4,226,793 | A | 10/1980 | Kotzsch et al. |
| 4,226,837 | A | 10/1980 | Achenbach et al. |
| 4,238,322 | A | 12/1980 | Brandt et al. |
| 4,273,589 | A | 6/1981 | Nauroth et al. |
| 4,274,883 | A | 6/1981 | Lumbeck et al. |
| 4,274,977 | A | 6/1981 | Koerner et al. |
| 4,278,587 | A | 7/1981 | Wolff et al. |
| 4,289,681 | A | 9/1981 | Nauroth et al. |
| 4,297,145 | A | 10/1981 | Wolff et al. |
| 4,307,023 | A | 12/1981 | Ettlinger et al. |
| 4,308,074 | A | 12/1981 | Nauroth et al. |
| 4,310,496 | A | 1/1982 | Achenbach et al. |
| 4,340,490 | A | 7/1982 | Junkermann et al. |
| 4,360,388 | A | 11/1982 | Nauroth et al. |
| 4,370,241 | A | 1/1983 | Junkermann et al. |

(Continued)

FOREIGN PATENT DOCUMENTS

| CN | 110172288 | 8/2019 |
| DE | 1239671 | 5/1967 |

(Continued)

OTHER PUBLICATIONS

Machine English translation of JP 2004-359752, Fujiki et al., Dec. 24, 2004.*

(Continued)

*Primary Examiner* — Patrick D Niland
(74) *Attorney, Agent, or Firm* — Grüneberg and Myers PLLC

(57) ABSTRACT

A method using silicon dioxide improves the cathodic anticorrosion effect of ground coats, preferably of a zinc primer, based on epoxy-functional polymers and at least one metal particle.

15 Claims, 2 Drawing Sheets

(56) References Cited

U.S. PATENT DOCUMENTS

| | | |
|---|---|---|
| 4,406,817 A | 9/1983 | Müller et al. |
| 4,410,589 A | 10/1983 | Müller et al. |
| 4,455,415 A | 6/1984 | Panster et al. |
| 4,495,167 A | 1/1985 | Nauroth et al. |
| 4,564,512 A | 1/1986 | Baacke et al. |
| 4,589,989 A | 5/1986 | Müller et al. |
| 4,632,952 A | 12/1986 | Bühler et al. |
| 4,719,146 A | 1/1988 | Hohage et al. |
| 4,757,101 A | 7/1988 | Kleinert et al. |
| 4,758,282 A | 7/1988 | Stober et al. |
| 4,771,092 A | 9/1988 | Ollenik et al. |
| 4,785,087 A | 11/1988 | Stober et al. |
| 4,812,257 A | 3/1989 | Stober et al. |
| 4,822,851 A | 4/1989 | Stober et al. |
| 4,844,980 A | 7/1989 | Grüning et al. |
| 4,877,595 A | 10/1989 | Klingle et al. |
| 4,889,775 A * | 12/1989 | Adaniya ............... C08G 18/643 428/626 |
| 4,891,394 A * | 1/1990 | Savin ................... C09D 127/06 524/439 |
| 4,940,784 A | 7/1990 | Stober et al. |
| 4,954,599 A | 9/1990 | Panster et al. |
| 4,963,437 A | 10/1990 | Ruf |
| 4,981,958 A | 1/1991 | Stober et al. |
| 4,993,884 A | 2/1991 | Mueller et al. |
| 4,999,413 A | 3/1991 | Panster et al. |
| 5,001,191 A | 3/1991 | Stober et al. |
| 5,003,024 A | 3/1991 | Panster et al. |
| 5,019,637 A | 5/1991 | Panster et al. |
| 5,034,207 A | 7/1991 | Kerner et al. |
| 5,053,279 A | 10/1991 | Daniels et al. |
| 5,061,773 A | 10/1991 | Panster et al. |
| 5,072,052 A | 12/1991 | Boeck et al. |
| 5,086,031 A | 2/1992 | Deller et al. |
| 5,093,451 A | 3/1992 | Panster et al. |
| 5,110,574 A | 5/1992 | Reinhardt et al. |
| 5,112,587 A | 5/1992 | Von Wedel et al. |
| 5,123,964 A | 6/1992 | Kerner et al. |
| 5,130,396 A | 7/1992 | Panster et al. |
| 5,143,962 A | 9/1992 | Wolff et al. |
| 5,154,904 A | 10/1992 | Kleinschmit et al. |
| 5,184,779 A | 2/1993 | Wolff et al. |
| 5,187,134 A | 2/1993 | Panster et al. |
| 5,239,033 A | 8/1993 | Panster et al. |
| 5,256,196 A | 10/1993 | Chjonowski et al. |
| 5,264,514 A | 11/1993 | Panster et al. |
| 5,279,832 A | 1/1994 | Greissinger et al. |
| 5,286,885 A | 2/1994 | Goetz et al. |
| 5,321,070 A | 6/1994 | Meier et al. |
| 5,338,348 A * | 8/1994 | Savin ................... C09D 5/106 106/14.44 |
| 5,352,791 A | 10/1994 | Panster et al. |
| 5,366,711 A | 11/1994 | Von Wedel et al. |
| 5,382,348 A | 1/1995 | Müller et al. |
| 5,403,566 A | 4/1995 | Panster et al. |
| 5,470,905 A | 11/1995 | Meier et al. |
| 5,484,581 A | 1/1996 | Esch et al. |
| 5,484,869 A | 1/1996 | Panster et al. |
| 5,591,873 A | 1/1997 | Bankmann et al. |
| 5,665,156 A | 9/1997 | Ettlinger et al. |
| 5,705,137 A | 1/1998 | Goerl et al. |
| 5,711,797 A | 1/1998 | Ettlinger et al. |
| 5,808,136 A | 9/1998 | Tacke et al. |
| 5,827,363 A | 10/1998 | Darsillo et al. |
| 5,846,506 A | 12/1998 | Esch et al. |
| 5,851,502 A | 12/1998 | Türk et al. |
| 5,859,117 A | 1/1999 | Goerl et al. |
| 5,871,867 A | 2/1999 | Rausch et al. |
| 5,925,708 A | 7/1999 | Esch et al. |
| 5,939,206 A * | 8/1999 | Kneezel ............... B32B 15/08 428/209 |
| 5,959,005 A | 9/1999 | Hartmann et al. |
| 5,959,164 A | 9/1999 | Lansink-Rotgerink et al. |
| 5,973,057 A | 10/1999 | Schoeley et al. |
| 5,976,480 A | 11/1999 | Mangold et al. |
| 6,001,887 A | 12/1999 | Keup et al. |
| 6,077,466 A | 6/2000 | Türk et al. |
| 6,180,076 B1 | 1/2001 | Uhrlandt et al. |
| 6,191,122 B1 | 2/2001 | Lux et al. |
| 6,194,594 B1 | 2/2001 | Görl et al. |
| 6,197,384 B1 | 3/2001 | Schubert et al. |
| 6,214,383 B1 | 4/2001 | Esch et al. |
| 6,268,424 B1 | 7/2001 | Blume et al. |
| 6,290,925 B1 | 9/2001 | Leutner et al. |
| 6,319,288 B1 | 11/2001 | Jakob et al. |
| 6,383,280 B1 | 5/2002 | Siray et al. |
| 6,395,247 B1 | 5/2002 | Siray et al. |
| 6,423,331 B1 | 7/2002 | Mangold et al. |
| 6,472,481 B1 | 10/2002 | Luginsland et al. |
| 6,521,713 B2 | 2/2003 | Wolff et al. |
| 6,592,970 B2 | 7/2003 | Ohta et al. |
| 6,593,393 B2 | 7/2003 | Frahn et al. |
| 6,613,309 B2 | 9/2003 | Uhrlandt et al. |
| 6,624,230 B2 | 9/2003 | Luginsland |
| 6,663,683 B2 | 12/2003 | Lortz et al. |
| 6,676,719 B2 | 1/2004 | Lortz et al. |
| 6,695,904 B2 | 2/2004 | Burger et al. |
| 6,695,907 B2 | 2/2004 | Scharfe et al. |
| 6,702,887 B2 | 3/2004 | Uhrlandt et al. |
| 6,720,369 B2 | 4/2004 | Goerl et al. |
| 6,752,864 B2 | 6/2004 | Meyer et al. |
| 6,759,486 B2 | 7/2004 | Luginsland et al. |
| 6,773,814 B2 | 8/2004 | Schumacher et al. |
| 6,794,445 B2 | 9/2004 | Reusmann et al. |
| 6,800,267 B2 | 10/2004 | Schubert et al. |
| 6,809,149 B2 | 10/2004 | Meyer et al. |
| 6,822,036 B1 | 11/2004 | Görl et al. |
| 6,830,816 B2 | 12/2004 | Mehnert et al. |
| 6,840,992 B2 | 1/2005 | Glaum et al. |
| 6,846,865 B2 | 1/2005 | Panz et al. |
| 6,872,402 B2 | 3/2005 | Mangold et al. |
| 6,899,951 B2 | 5/2005 | Panz et al. |
| 6,902,715 B2 | 6/2005 | Maus et al. |
| 6,921,781 B2 | 7/2005 | Schubert et al. |
| 6,956,080 B2 | 10/2005 | Scholz et al. |
| 6,960,251 B2 | 11/2005 | Uhrlandt et al. |
| 6,977,065 B1 | 12/2005 | Esch et al. |
| 7,022,375 B2 | 4/2006 | Schachtely et al. |
| 7,026,398 B2 | 4/2006 | Monkiewicz et al. |
| 7,070,749 B2 | 7/2006 | Lindner et al. |
| 7,071,257 B2 | 7/2006 | Esch et al. |
| 7,074,457 B2 | 7/2006 | Panz et al. |
| 7,095,929 B2 | 8/2006 | Nowak et al. |
| 7,097,818 B2 | 8/2006 | Lindner et al. |
| 7,144,930 B2 | 12/2006 | Meyer et al. |
| 7,169,322 B2 | 1/2007 | Menzel et al. |
| 7,204,969 B2 | 4/2007 | Kuhlmann et al. |
| 7,220,449 B2 | 5/2007 | Schachtely et al. |
| 7,255,735 B2 | 8/2007 | Meyer et al. |
| 7,282,236 B2 | 10/2007 | Michael et al. |
| 7,285,330 B2 | 10/2007 | Meyer et al. |
| 7,303,624 B2 | 12/2007 | Meyer et al. |
| 7,361,777 B2 | 4/2008 | Herrwerth et al. |
| 7,402,293 B2 | 7/2008 | Meyer et al. |
| 7,442,666 B2 | 10/2008 | Herrwerth et al. |
| 7,452,600 B2 | 11/2008 | Meyer et al. |
| 7,488,382 B2 | 2/2009 | Schubert et al. |
| 7,553,889 B2 | 6/2009 | Christian et al. |
| 7,563,317 B2 | 7/2009 | Meyer et al. |
| 7,563,839 B2 | 7/2009 | Scholz et al. |
| 7,566,433 B2 | 7/2009 | Stenzel et al. |
| 7,598,334 B2 | 10/2009 | Ferenz et al. |
| 7,605,284 B2 | 10/2009 | Brueckner et al. |
| 7,608,234 B2 | 10/2009 | Stenzel et al. |
| 7,628,971 B2 | 12/2009 | Stenzel et al. |
| 7,659,328 B2 | 2/2010 | Scholz et al. |
| 7,713,626 B2 | 5/2010 | Meyer et al. |
| 7,727,599 B2 | 6/2010 | Doehler et al. |
| 7,759,402 B2 | 7/2010 | Venzmer et al. |
| 7,767,180 B2 | 8/2010 | Panz et al. |
| 7,790,131 B2 | 9/2010 | Stenzel et al. |
| 7,790,797 B2 | 9/2010 | Blumenschein et al. |
| 7,816,442 B2 | 10/2010 | Christian et al. |
| 7,834,122 B2 | 11/2010 | Ferenz et al. |

(56) References Cited

U.S. PATENT DOCUMENTS

| | | |
|---|---|---|
| 7,846,529 B2 | 12/2010 | Nun et al. |
| 7,855,248 B2 | 12/2010 | Stenzel et al. |
| 7,871,588 B2 | 1/2011 | Lindner et al. |
| 7,893,128 B2 | 2/2011 | Busch et al. |
| 7,964,694 B2 | 6/2011 | Ferenz et al. |
| 7,972,431 B2 | 7/2011 | Meyer et al. |
| 7,977,523 B2 | 7/2011 | Zanthoff et al. |
| 7,981,211 B2 | 7/2011 | Meyer et al. |
| 8,007,751 B2 | 8/2011 | Panz et al. |
| 8,012,253 B2 | 9/2011 | Schubert et al. |
| 8,017,098 B2 | 9/2011 | Uhrlandt et al. |
| 8,022,130 B2 | 9/2011 | Nowak et al. |
| 8,030,366 B2 | 10/2011 | Ferenz et al. |
| 8,034,848 B2 | 10/2011 | Landers et al. |
| 8,038,788 B2 | 10/2011 | Michael et al. |
| 8,071,215 B2 | 12/2011 | Meyer et al. |
| 8,075,862 B2 | 12/2011 | Meyer et al. |
| 8,084,633 B2 | 12/2011 | Herrwerth et al. |
| 8,092,587 B2 | 1/2012 | Zschunke et al. |
| 8,129,314 B2 | 3/2012 | Heindl et al. |
| 8,138,372 B2 | 3/2012 | Herrwerth et al. |
| 8,152,916 B2 | 4/2012 | Meyer et al. |
| 8,163,080 B2 | 4/2012 | Meyer et al. |
| 8,172,936 B2 | 5/2012 | Herrwerth et al. |
| 8,173,737 B2 | 5/2012 | Scholz et al. |
| 8,211,841 B2 | 7/2012 | Allef et al. |
| 8,211,972 B2 | 7/2012 | Meyer et al. |
| 8,211,995 B2 | 7/2012 | Kühner et al. |
| 8,247,525 B2 | 8/2012 | Schubert et al. |
| 8,268,939 B2 | 9/2012 | Ebbrecht et al. |
| 8,283,040 B2 | 10/2012 | Spyrou et al. |
| 8,293,834 B2 | 10/2012 | Meyer et al. |
| 8,314,039 B2 | 11/2012 | Oles et al. |
| 8,333,914 B2 | 12/2012 | Pitsch et al. |
| 8,337,794 B2 | 12/2012 | Scholz et al. |
| 8,338,528 B2 | 12/2012 | Scholz et al. |
| 8,389,617 B2 | 3/2013 | Meyer et al. |
| 8,404,774 B2 | 3/2013 | Meyer et al. |
| 8,420,163 B2 | 4/2013 | Nun et al. |
| 8,466,248 B2 | 6/2013 | Meyer et al. |
| 8,480,846 B2 | 7/2013 | Meyer et al. |
| 8,507,033 B2 | 8/2013 | Meyer et al. |
| 8,512,595 B2 | 8/2013 | Meyer et al. |
| 8,524,284 B2 | 9/2013 | Lortz et al. |
| 8,597,425 B2 | 12/2013 | Stenzel et al. |
| 8,614,256 B2 | 12/2013 | Panz et al. |
| 8,617,504 B2 | 12/2013 | Panz et al. |
| 8,617,529 B2 | 12/2013 | Herrwerth et al. |
| 8,642,525 B2 | 2/2014 | Herrwerth et al. |
| 8,658,816 B2 | 2/2014 | Wehmeier et al. |
| 8,680,356 B2 | 3/2014 | Zanthoff et al. |
| 8,685,376 B2 | 4/2014 | Czech et al. |
| 8,722,838 B2 | 5/2014 | Scholz et al. |
| 8,772,423 B2 | 7/2014 | De Gans et al. |
| 8,778,319 B2 | 7/2014 | Herrwerth et al. |
| 8,779,031 B2 | 7/2014 | Schachtely et al. |
| 8,835,535 B2 | 9/2014 | Fischer et al. |
| 8,841,400 B2 | 9/2014 | Henning et al. |
| 8,933,164 B2 | 1/2015 | Peggau et al. |
| 8,962,519 B2 | 2/2015 | Heindl et al. |
| 8,986,442 B2 | 3/2015 | Luginsland et al. |
| 8,993,093 B2 | 3/2015 | Hasskerl et al. |
| 8,993,792 B2 | 3/2015 | Hartung et al. |
| 9,073,818 B2 | 7/2015 | Herrwerth et al. |
| 9,138,385 B2 | 9/2015 | Dahl et al. |
| 9,155,692 B2 | 10/2015 | Veeger et al. |
| 9,200,216 B2 | 12/2015 | Boeing et al. |
| 9,221,945 B2 | 12/2015 | Alzer et al. |
| 9,233,986 B2 | 1/2016 | Kratel et al. |
| 9,266,825 B2 | 2/2016 | Lomoelder et al. |
| 9,353,289 B2 | 5/2016 | De Gans et al. |
| 9,388,314 B2 | 7/2016 | Kuehner |
| 9,540,247 B2 | 1/2017 | Stenzel et al. |
| 9,616,007 B2 | 4/2017 | Herrwerth et al. |
| 9,617,390 B2 | 4/2017 | Hinzmann et al. |
| 9,663,622 B2 | 5/2017 | Hinzmann et al. |
| 9,708,458 B2 | 7/2017 | Scholz et al. |
| 9,738,535 B2 | 8/2017 | Panz et al. |
| 9,784,402 B2 | 10/2017 | Menzel et al. |
| 9,796,876 B2 | 10/2017 | Lomoelder et al. |
| 9,902,095 B2 | 2/2018 | Stapperfenne et al. |
| 9,902,096 B2 | 2/2018 | Stapperfenne et al. |
| 9,926,451 B2 | 3/2018 | Blume et al. |
| 10,065,865 B2 | 9/2018 | Fuhrmann et al. |
| 10,100,207 B2 | 10/2018 | Stache et al. |
| 10,106,426 B2 | 10/2018 | Panz et al. |
| 10,179,751 B2 | 1/2019 | Geisler et al. |
| 10,239,898 B2 | 3/2019 | Hallack et al. |
| 10,280,088 B2 | 5/2019 | Schulze Isfort et al. |
| 10,308,820 B2 | 6/2019 | Duerr et al. |
| 10,618,849 B2 | 4/2020 | Albinus et al. |
| 10,626,291 B2 | 4/2020 | Hallack et al. |
| 10,633,555 B2 | 4/2020 | Stache et al. |
| 10,723,628 B2 | 7/2020 | Lortz et al. |
| 10,752,510 B2 | 8/2020 | Drexel et al. |
| 11,021,608 B2 | 6/2021 | Seyfried et al. |
| 11,123,765 B2 | 9/2021 | Scheffler et al. |
| 11,242,259 B2 | 2/2022 | Schulze Isfort et al. |
| 11,254,819 B2 | 2/2022 | Hallack et al. |
| 11,254,896 B2 | 2/2022 | Kuppert et al. |
| 11,267,975 B2 | 3/2022 | Michael et al. |
| 11,352,510 B2 | 6/2022 | Michael et al. |
| 2001/0042493 A1 | 11/2001 | Scharfe et al. |
| 2002/0022693 A1 | 2/2002 | Luginsland |
| 2002/0037936 A1 | 3/2002 | Michael et al. |
| 2002/0040661 A1 | 4/2002 | Glaum et al. |
| 2002/0055556 A1 | 5/2002 | Schubert et al. |
| 2002/0061404 A1 | 5/2002 | Schubert et al. |
| 2002/0061979 A1 | 5/2002 | Wolff et al. |
| 2002/0077381 A1 | 6/2002 | Frahn et al. |
| 2002/0077388 A1 | 6/2002 | Meyer et al. |
| 2002/0077407 A1 | 6/2002 | Meyer et al. |
| 2002/0091190 A1 | 7/2002 | Goerl et al. |
| 2002/0095873 A1 | 7/2002 | Lortz et al. |
| 2002/0102198 A1 | 8/2002 | Kuhlmann et al. |
| 2002/0112647 A1 | 8/2002 | Lindner et al. |
| 2002/0121156 A1 | 9/2002 | Menzel et al. |
| 2002/0134027 A1 | 9/2002 | Lortz et al. |
| 2002/0150528 A1 | 10/2002 | Maus et al. |
| 2002/0155256 A1 | 10/2002 | Ohta et al. |
| 2002/0169248 A1 | 11/2002 | Esch et al. |
| 2002/0197311 A1 | 12/2002 | Hasenzahl et al. |
| 2003/0003040 A1 | 1/2003 | Lindner et al. |
| 2003/0008974 A1 | 1/2003 | Mehnert et al. |
| 2003/0037706 A1 | 2/2003 | Uhrlandt et al. |
| 2003/0041777 A1 | 3/2003 | Karl et al. |
| 2003/0041779 A1 | 3/2003 | Burger et al. |
| 2003/0059380 A1 | 3/2003 | Uhrlandt et al. |
| 2003/0068281 A1 | 4/2003 | Uhrlandt et al. |
| 2003/0088034 A1 | 5/2003 | Luginsland et al. |
| 2003/0089279 A1 | 5/2003 | Meyer et al. |
| 2003/0104198 A1 | 6/2003 | Schumacher et al. |
| 2003/0118499 A1 | 6/2003 | Scharfe et al. |
| 2003/0130379 A1 | 7/2003 | Panz et al. |
| 2003/0144404 A1 | 7/2003 | Schachtely et al. |
| 2003/0162881 A1 | 8/2003 | Panz et al. |
| 2003/0181565 A1 | 9/2003 | Panz et al. |
| 2003/0186066 A1 | 10/2003 | Monkiewicz et al. |
| 2003/0195290 A1 | 10/2003 | Scholz et al. |
| 2003/0198819 A1 | 10/2003 | Reusmann et al. |
| 2003/0235624 A1 | 12/2003 | Mangold et al. |
| 2004/0024070 A1 | 2/2004 | Michael et al. |
| 2004/0047792 A1 | 3/2004 | Schubert et al. |
| 2004/0120876 A1 | 6/2004 | Meyer et al. |
| 2004/0121156 A1 | 6/2004 | Meyer et al. |
| 2004/0127604 A1 | 7/2004 | Meyer et al. |
| 2004/0249049 A1 | 12/2004 | Christian et al. |
| 2005/0103231 A1 | 5/2005 | Geisselmann et al. |
| 2005/0118911 A1 | 6/2005 | Oles et al. |
| 2005/0124731 A1 | 6/2005 | Blumenschein et al. |
| 2005/0124749 A1 | 6/2005 | Schachtely et al. |
| 2005/0129961 A1 | 6/2005 | Deller |
| 2005/0136269 A1 | 6/2005 | Doehler et al. |
| 2005/0137317 A1 | 6/2005 | Lindner et al. |

(56) References Cited

U.S. PATENT DOCUMENTS

| | | |
|---|---|---|
| 2005/0171268 A1 | 8/2005 | Scholz et al. |
| 2005/0187334 A1 | 8/2005 | Blume et al. |
| 2005/0191228 A1 | 9/2005 | Panz et al. |
| 2005/0192190 A1 | 9/2005 | Hasenzahl et al. |
| 2005/0192395 A1 | 9/2005 | Panz et al. |
| 2005/0215668 A1 | 9/2005 | Scholz et al. |
| 2005/0215696 A1 | 9/2005 | Scholz et al. |
| 2005/0232556 A1 | 10/2005 | Nowak et al. |
| 2005/0241531 A1 | 11/2005 | Meyer et al. |
| 2005/0244513 A1 | 11/2005 | Lortz et al. |
| 2005/0244642 A1 | 11/2005 | Meyer et al. |
| 2005/0282951 A1 | 12/2005 | Esch et al. |
| 2005/0287300 A1 | 12/2005 | Herrwerth et al. |
| 2006/0009545 A1 | 1/2006 | Frahn et al. |
| 2006/0014658 A1 | 1/2006 | Zimmermann et al. |
| 2006/0041097 A1 | 2/2006 | Herrwerth et al. |
| 2006/0093541 A1 | 5/2006 | Uhrlandt et al. |
| 2006/0099129 A1 | 5/2006 | Stenzel et al. |
| 2006/0100344 A1 | 5/2006 | Stenzel et al. |
| 2006/0137575 A1 | 6/2006 | Stenzel et al. |
| 2006/0144296 A1 | 7/2006 | Meyer et al. |
| 2006/0147675 A1 | 7/2006 | Nun et al. |
| 2006/0155089 A1 | 7/2006 | Ferenz et al. |
| 2006/0165581 A1 | 7/2006 | Stenzel et al. |
| 2006/0254463 A1 | 11/2006 | Luginsland et al. |
| 2006/0292192 A1 | 12/2006 | Hasenzahl et al. |
| 2007/0059232 A1 | 3/2007 | Stenzel et al. |
| 2007/0059539 A1 | 3/2007 | Doehler et al. |
| 2007/0100057 A1 | 5/2007 | Stenzel et al. |
| 2007/0100153 A1 | 5/2007 | Brueckner et al. |
| 2007/0123599 A1 | 5/2007 | Eilbracht et al. |
| 2007/0129480 A1 | 6/2007 | Nowak et al. |
| 2007/0173587 A1 | 7/2007 | Scholz et al. |
| 2007/0190306 A1 | 8/2007 | Herrwerth et al. |
| 2007/0191225 A1 | 8/2007 | Heindl et al. |
| 2007/0191537 A1 | 8/2007 | Meyer et al. |
| 2007/0202030 A1 | 8/2007 | Michael et al. |
| 2007/0203307 A1 | 8/2007 | Cavaleiro et al. |
| 2007/0275144 A1 | 11/2007 | Wiesmuller |
| 2007/0286788 A1 | 12/2007 | Panz et al. |
| 2007/0287765 A1 | 12/2007 | Busch et al. |
| 2007/0299203 A1 | 12/2007 | Panz et al. |
| 2007/0299231 A1 | 12/2007 | Doehler et al. |
| 2008/0027202 A1 | 1/2008 | Ferenz et al. |
| 2008/0058573 A1 | 3/2008 | Zanthoff et al. |
| 2008/0064782 A1 | 3/2008 | Doehler et al. |
| 2008/0076842 A1 | 3/2008 | Ferenz et al. |
| 2008/0139756 A1 | 6/2008 | Christian et al. |
| 2008/0216708 A1 | 9/2008 | Herrwerth et al. |
| 2008/0293871 A1 | 11/2008 | Stenzel et al. |
| 2008/0305065 A1 | 12/2008 | Ferenz et al. |
| 2008/0306288 A1 | 12/2008 | Schirrmeister et al. |
| 2008/0315004 A1 | 12/2008 | Nagel et al. |
| 2009/0007483 A1 | 1/2009 | Hansel et al. |
| 2009/0012197 A1 | 1/2009 | Landers et al. |
| 2009/0053552 A1 | 2/2009 | De Gans et al. |
| 2009/0054521 A1 | 2/2009 | Herrwerth et al. |
| 2009/0076194 A1 | 3/2009 | Meyer et al. |
| 2009/0093598 A1 | 4/2009 | Venzmer et al. |
| 2009/0101866 A1 | 4/2009 | Schubert et al. |
| 2009/0137732 A1 | 5/2009 | Panz et al. |
| 2009/0176922 A1 | 7/2009 | Scholz et al. |
| 2009/0186053 A1 | 7/2009 | Meyer et al. |
| 2009/0202835 A1 | 8/2009 | Pitsch et al. |
| 2009/0258968 A1 | 10/2009 | Meyer et al. |
| 2009/0292097 A1 | 11/2009 | Scholz et al. |
| 2009/0301345 A1 | 12/2009 | Mangold et al. |
| 2009/0311341 A1 | 12/2009 | Nagel et al. |
| 2010/0022694 A1 | 1/2010 | Meyer et al. |
| 2010/0031852 A1 | 2/2010 | Herrwerth et al. |
| 2010/0034765 A1 | 2/2010 | Herrwerth et al. |
| 2010/0036011 A1 | 2/2010 | De Gans et al. |
| 2010/0081763 A1 | 4/2010 | Meyer et al. |
| 2010/0093884 A1 | 4/2010 | Spyrou et al. |
| 2010/0105818 A1 | 4/2010 | Meyer et al. |
| 2010/0126387 A1 | 5/2010 | Meyer et al. |
| 2010/0137485 A1 | 6/2010 | Scholz et al. |
| 2010/0152349 A1 | 6/2010 | Meyer et al. |
| 2010/0152350 A1 | 6/2010 | Meyer et al. |
| 2010/0168305 A1 | 7/2010 | Meyer et al. |
| 2010/0168326 A1 | 7/2010 | Scholz et al. |
| 2010/0179276 A1 | 7/2010 | Meyer et al. |
| 2010/0184913 A1 | 7/2010 | Ebbrecht et al. |
| 2010/0196243 A1 | 8/2010 | Meyer et al. |
| 2010/0197854 A1 | 8/2010 | Kuehner et al. |
| 2010/0200803 A1 | 8/2010 | Meyer et al. |
| 2010/0203173 A1 | 8/2010 | Scheffler et al. |
| 2010/0210445 A1 | 8/2010 | Von Rymon Lipinski et al. |
| 2010/0233059 A1 | 9/2010 | Meyer et al. |
| 2010/0236451 A1 | 9/2010 | Michael et al. |
| 2010/0254876 A1 | 10/2010 | Kneisel et al. |
| 2010/0261823 A1 | 10/2010 | Kneisel et al. |
| 2010/0266651 A1 | 10/2010 | Czech et al. |
| 2010/0286311 A1 | 11/2010 | Meyer et al. |
| 2010/0288164 A1 | 11/2010 | Schubert et al. |
| 2010/0305236 A1 | 12/2010 | Scholz et al. |
| 2010/0324173 A1 | 12/2010 | Fischer et al. |
| 2011/0021398 A1 | 1/2011 | Allef et al. |
| 2011/0021801 A1 | 1/2011 | Wehmeier et al. |
| 2011/0039983 A1 | 2/2011 | Kuehner |
| 2011/0045247 A1 | 2/2011 | Nun et al. |
| 2011/0045723 A1 | 2/2011 | Nowak et al. |
| 2011/0070175 A1 | 3/2011 | Herrwerth et al. |
| 2011/0071256 A1 | 3/2011 | Nowak et al. |
| 2011/0078920 A1 | 4/2011 | Tschernjaew et al. |
| 2011/0091399 A1 | 4/2011 | Meyer et al. |
| 2011/0112219 A1 | 5/2011 | Schachtely et al. |
| 2011/0136919 A1 | 6/2011 | Heindl et al. |
| 2011/0152596 A1 | 6/2011 | Zanthoff et al. |
| 2011/0172343 A1 | 7/2011 | Panz et al. |
| 2011/0179970 A1 | 7/2011 | Zschunke et al. |
| 2011/0182796 A1 | 7/2011 | Lang et al. |
| 2011/0206623 A1 | 8/2011 | Wenk et al. |
| 2011/0214425 A1 | 9/2011 | Lang et al. |
| 2011/0236288 A1 | 9/2011 | Panz et al. |
| 2011/0236291 A1 | 9/2011 | Lang et al. |
| 2011/0244238 A1 | 10/2011 | Panz et al. |
| 2011/0281973 A1 | 11/2011 | Schubert et al. |
| 2011/0302849 A1 | 12/2011 | Stenner et al. |
| 2012/0015893 A1 | 1/2012 | Herrwerth et al. |
| 2012/0021960 A1 | 1/2012 | Wenk et al. |
| 2012/0027704 A1 | 2/2012 | Henning et al. |
| 2012/0071564 A1 | 3/2012 | De Gans et al. |
| 2012/0114865 A1 | 5/2012 | Peggau et al. |
| 2012/0152151 A1 | 6/2012 | Meyer et al. |
| 2012/0251707 A1 | 10/2012 | Scholz et al. |
| 2012/0294819 A1 | 11/2012 | Herrwerth et al. |
| 2012/0321803 A1 | 12/2012 | Borup et al. |
| 2012/0322893 A1 | 12/2012 | Drexel et al. |
| 2013/0008585 A1 | 1/2013 | Hasskerl et al. |
| 2013/0030233 A1 | 1/2013 | Boeing et al. |
| 2013/0071343 A1 | 3/2013 | Herrwerth et al. |
| 2013/0078208 A1 | 3/2013 | Herrwerth et al. |
| 2013/0171087 A1 | 7/2013 | Herrwerth et al. |
| 2013/0204021 A1 | 8/2013 | Hartung et al. |
| 2013/0251616 A1 | 9/2013 | Stenzel et al. |
| 2013/0259821 A1 | 10/2013 | Henning et al. |
| 2013/0267403 A1 | 10/2013 | Von Rymon Lipinski et al. |
| 2013/0331592 A1 | 12/2013 | Hartung et al. |
| 2014/0042359 A1 | 2/2014 | Fuhrmann et al. |
| 2014/0102334 A1 | 4/2014 | Scholz et al. |
| 2014/0134125 A1 | 5/2014 | Dahl et al. |
| 2014/0150242 A1 | 6/2014 | Kratel et al. |
| 2015/0073069 A1 | 3/2015 | De Gans et al. |
| 2015/0094419 A1 | 4/2015 | Alzer et al. |
| 2015/0191625 A1 | 7/2015 | Lomoelder et al. |
| 2015/0204477 A1 | 7/2015 | Menzel et al. |
| 2015/0225337 A1 | 8/2015 | Lomoelder et al. |
| 2015/0321392 A1 | 11/2015 | Stapperfenne et al. |
| 2015/0321393 A1 | 11/2015 | Stapperfenne et al. |
| 2015/0368440 A1 | 12/2015 | Scholz et al. |
| 2016/0017165 A1 | 1/2016 | Numrich et al. |
| 2016/0082415 A1 | 3/2016 | Drexel et al. |
| 2016/0107895 A1 | 4/2016 | Schulze Isfort et al. |

(56) References Cited

U.S. PATENT DOCUMENTS

| | | | |
|---|---|---|---|
| 2016/0108280 A1 | 4/2016 | Hallack et al. |
| 2016/0151805 A1 | 6/2016 | Scheffler et al. |
| 2016/0185918 A1 | 6/2016 | Hinzmann et al. |
| 2016/0207785 A1 | 7/2016 | Panz et al. |
| 2016/0222169 A1 | 8/2016 | Hinzmann et al. |
| 2016/0249642 A1 | 9/2016 | Rabe et al. |
| 2016/0297974 A1 | 10/2016 | Stache et al. |
| 2016/0326374 A1 | 11/2016 | Blume et al. |
| 2017/0233297 A1 | 8/2017 | Albinus et al. |
| 2017/0298250 A1 | 10/2017 | Anselmann et al. |
| 2018/0065892 A1 | 3/2018 | Geisler et al. |
| 2018/0100071 A1 | 4/2018 | Duerr et al. |
| 2018/0179234 A1 | 6/2018 | Hallack et al. |
| 2019/0031977 A1 | 1/2019 | Kuppert et al. |
| 2019/0048224 A1 | 2/2019 | Stache et al. |
| 2019/0106328 A1 | 4/2019 | Lortz et al. |
| 2019/0106581 A1 | 4/2019 | Michael et al. |
| 2019/0161355 A1 | 5/2019 | Schulze Isfort et al. |
| 2019/0241741 A1 | 8/2019 | Seyfried et al. |
| 2019/0276358 A1 | 9/2019 | Schultz et al. |
| 2020/0031720 A1 | 1/2020 | Geisler et al. |
| 2020/0140282 A1 | 5/2020 | Erz et al. |
| 2020/0308406 A1 | 10/2020 | Seyfried et al. |
| 2020/0377702 A1 | 12/2020 | Schoeffel et al. |
| 2021/0102091 A1 | 4/2021 | Albert et al. |
| 2021/0122921 A1 | 4/2021 | Hallack et al. |
| 2021/0206972 A1 | 7/2021 | Schulz et al. |
| 2021/0253889 A1 | 8/2021 | Schulte et al. |
| 2021/0277257 A1 | 9/2021 | Roland et al. |
| 2021/0292238 A1 | 9/2021 | Albinus et al. |
| 2021/0403753 A1 | 12/2021 | Schulte et al. |
| 2022/0041869 A1 | 2/2022 | Michael et al. |
| 2022/0073765 A1 | 3/2022 | Hinrichs et al. |

FOREIGN PATENT DOCUMENTS

| | | | |
|---|---|---|---|
| DE | 1493590 | 9/1969 | |
| DE | 1667459 | 6/1971 | |
| DE | 1768781 | 12/1971 | |
| DE | 1795557 | 3/1972 | |
| DE | 2258900 | 6/1974 | |
| DE | 2443853 | 4/1976 | |
| DE | 2532473 | 2/1977 | |
| DE | 2532475 | 2/1977 | |
| DE | 3220393 | 12/1983 | |
| DE | 3431865 | 3/1986 | |
| DE | 3735107 | 4/1989 | |
| DE | 4308311 | 9/1994 | |
| DE | 29508083 U1 | 10/1995 | |
| DE | 4435157 | 4/1996 | |
| DE | 19500673 | 7/1996 | |
| DE | 19514254 | 7/1996 | |
| DE | 19853122 | 5/2000 | |
| DE | 19916498 | 10/2000 | |
| DE | 10122861 | 3/2002 | |
| DE | 10124298 | 11/2002 | |
| DE | 10151777 | 8/2003 | |
| DE | 10242039 | 4/2004 | |
| DE | 10253193 | 6/2004 | |
| DE | 29724802 | 11/2004 | |
| DE | 10 2004 001407 | 7/2005 | |
| DE | 10 2004 005156 | 8/2005 | |
| DE | 10 2004 005157 | 8/2005 | |
| DE | 10 2004 005221 | 8/2005 | |
| DE | 10 2004 034740 | 2/2006 | |
| DE | 10 2004 055586 | 5/2006 | |
| DE | 10 2005 001040 | 7/2006 | |
| DE | 10 2005 002716 | 8/2006 | |
| DE | 10 2005 004676 | 8/2006 | |
| DE | 10 2006 033136 | 1/2008 | |
| DE | 10 2006 057692 | 6/2008 | |
| DE | 10 2007 051830 | 5/2009 | |
| DE | 10 2008 005548 | 7/2009 | |
| DE | 10 2008 036430 | 2/2010 | |
| DE | 10 2010 031094 | 1/2012 | |
| DE | 10 2011 017783 | 10/2012 | |
| DE | 10 2012 210294 | 12/2013 | |
| DE | 10 2012 213021 | 1/2014 | |
| DE | 10 2015 214344 | 2/2017 | |
| DE | 10 2015 221449 | 5/2017 | |
| DE | 10 2016 205777 | 10/2017 | |
| EP | 0 003 217 | 8/1979 | |
| EP | 0 023 533 | 2/1981 | |
| EP | 0 062 748 | 10/1982 | |
| EP | 0 082 924 | 7/1983 | |
| EP | 0 108 863 | 5/1984 | |
| EP | 0 180 129 | 5/1986 | |
| EP | 0 353 431 | 2/1990 | |
| EP | 0 353 432 | 2/1990 | |
| EP | 0 355 295 | 2/1990 | |
| EP | 0 436 791 | 7/1991 | |
| EP | 0 579 999 | 1/1994 | |
| EP | 0 635 537 | 1/1995 | |
| EP | 0 764 687 | 3/1997 | |
| EP | 0703952 B1 * | 7/1997 | |
| EP | 0 798 266 | 10/1997 | |
| EP | 0 937 755 | 8/1999 | |
| EP | 0 985 636 | 3/2000 | |
| EP | 1 018 303 | 7/2000 | |
| EP | 1 595 909 | 11/2005 | |
| EP | 1 892 327 | 2/2008 | |
| EP | 1 900 765 | 3/2008 | |
| EP | 1 914 261 | 4/2008 | |
| EP | 2 198 932 | 6/2010 | |
| EP | 2 576 497 | 4/2013 | |
| EP | 2 910 724 | 8/2015 | |
| EP | 3 056 501 | 8/2016 | |
| EP | 3 447 038 | 2/2019 | |
| EP | 3 717 560 | 10/2020 | |
| JP | 2004359752 A * | 12/2004 | |
| KR | 2014-0005476 A | 1/2014 | |
| WO | WO-9629372 A1 * | 9/1996 | ........... C09D 163/00 |
| WO | 2004/005393 | 1/2004 | |
| WO | 2004/058932 | 7/2004 | |
| WO | 2004/103093 | 12/2004 | |
| WO | 2006/042598 | 4/2006 | |
| WO | 2007/057262 | 5/2007 | |
| WO | 2008/077673 | 7/2008 | |
| WO | 2009/015968 | 2/2009 | |
| WO | 2009/030587 | 3/2009 | |
| WO | 2009/071467 | 6/2009 | |
| WO | 2009/095139 | 8/2009 | |
| WO | 2010/022544 | 3/2010 | |
| WO | 2010/046181 | 4/2010 | |
| WO | 2011076518 | 6/2011 | |
| WO | 2011/151119 | 12/2011 | |
| WO | 2013/113685 | 8/2013 | |
| WO | 2013/117375 | 8/2013 | |
| WO | 2013/124162 | 8/2013 | |
| WO | 2013/189699 | 12/2013 | |
| WO | 2014/060247 | 4/2014 | |
| WO | 2014/060250 | 4/2014 | |
| WO | 2014/106580 | 7/2014 | |
| WO | 2014/106582 | 7/2014 | |
| WO | 2014/135353 | 9/2014 | |
| WO | 2014/146729 | 9/2014 | |
| WO | 2015/007450 | 1/2015 | |
| WO | 2015/052048 | 4/2015 | |
| WO | 2017/097768 | 6/2017 | |
| WO | 2018/228878 | 12/2018 | |
| WO | 2019/011780 | 1/2019 | |
| WO | 2019/105602 | 6/2019 | |
| WO | 2021/073914 | 4/2021 | |
| WO | 2021/073915 | 4/2021 | |
| WO | 2022/008427 | 1/2022 | |
| WO | 2022/022988 | 2/2022 | |

OTHER PUBLICATIONS

Author Unknown, Evonik Resource Efficiency GmbH Aerosil Product Information, "Aerosil 300", pp. 1-2, Feb. 2016.*

Author Unknown, Evonik Industries AG, Aerosil Product Information, "Aerosil R 972", pp. 1-2, Aug. 2013.*

(56) References Cited

OTHER PUBLICATIONS

European Search Report issued Feb. 1, 2021 in EP 20190611.2, 7 pages.
Lu, et al, "Synthesis and characterization of silica-acrylic-epoxy hybrid coatings on 430 stainless steel," *Surface & Coatings Technology*, 204 (2009), pp. 91-98.
Ranjbar, et al., "Effects of Nano Silica on the Anticorrosive Properties of Epoxy Coatings," *Progress in Color, Colorants and Coatings*, 6 (2013), 119-128, Web page <www.pccc.icrc.ac.ir>, available online May 21, 2013.
U.S. Pat. No. 6,521,713, Feb. 18, 2003, 2002/0061979, Wolff et al.
U.S. Appl. No. 12/471,974, filed May 26, 2009, 2009/0301345, Mangold et al.
U.S. Pat. No. 6,592,970, Jul. 15, 2003, 2002/0155256, Ohta et al.
U.S. Pat. No. 6,759,486, Jul. 6, 2004, 2003/0088034, Luginsland et al.
U.S. Pat. No. 7,071,257, Jul. 4, 2006, 2002/0169248, Esch et al.
U.S. Appl. No. 11/194,481, filed Aug. 2, 2005, 2005/0282951, Esch et al.
U.S. Pat. No. 6,624,230, Sep. 23, 2003, 2002/0022693, Hans-Detlef Luginsland.
U.S. Pat. No. 6,872,402, Mar. 29, 2005, 2003/0235624, Mangold et al.
U.S. Appl. No. 09/740,039, filed Dec. 20, 2000, 2002/0037936, Michael et al.
U.S. Pat. No. 7,282,236, Oct. 16, 2007, 2004/0024070, Michael et al.
U.S. Appl. No. 11/741,381, filed Apr. 27, 2007, 2007/0202030, Michael et al.
U.S. Pat. No. 7,144,930, Dec. 5, 2006, 2002/0077388, Meyer et al.
U.S. Appl. No. 09/829,014, filed Apr. 10, 2001, 2001/0042493, Scharfe et al.
U.S. Pat. No. 6,695,907, Feb. 24, 2004, 2003/0118499, Scharfe et al.
U.S. Pat. No. 6,593,393, Jul. 15, 2003, 2002/0077381, Frahn et al.
U.S. Pat. No. 6,809,149, Oct. 26, 2004, 2002/0077407, Meyer et al.
U.S. Appl. No. 10/116,130, filed Apr. 5, 2002, 2003/0041777, Karl et al.
U.S. Pat. No. 6,663,683, Dec. 16, 2003, 2002/0095873, Lortz et al.
U.S. Pat. No. 6,676,719, Jan. 13, 2004, 2002/0134027, Lortz et al.
U.S. Pat. No. 6,752,864, Jun. 22, 2004, 2003/0089279, Meyer et al.
U.S. Pat. No. 7,169,322, Jan. 30, 2007, 2002/0121156, Menzel et al.
U.S. Pat. No. 6,773,814, Aug. 10, 2004, 2003/0104198, Schumacher et al.
U.S. Pat. No. 6,921,781, Jul. 26, 2005, 2002/0055556, Schubert et al.
U.S. Pat. No. 6,800,267, Oct. 5, 2004, 2002/0061404, Schubert et al.
U.S. Pat. No. 6,720,369, Apr. 13, 2004, 2002/0091190, Goerl et al.
U.S. Pat. No. 7,204,969, Apr. 17, 2007, 2002/0102198, Kuhlmann et al.
U.S. Pat. No. 7,070,749, Jul. 4, 2006, 2002/0112647, Lindner et al.
U.S. Pat. No. 6,840,992, Jan. 11, 2005, 2002/0040661, Glaum et al.
U.S. Pat. No. 7,095,929, Aug. 22, 2006, 2005/0232556, Nowak et al.
U.S. Appl. No. 10/522,903, filed Feb. 1, 2005, 2006/0009545, Frahn et al.
U.S. Pat. No. 7,452,600, Nov. 18, 2008, 2005/0244642, Meyer et al.
U.S. Appl. No. 10/157,181, filed May 30, 2002, 2002/0197311, Hasenzahl et al.
U.S. Appl. No. 10/597,419, filed Jun. 26, 2008, 2009/0186053, Meyer et al.
U.S. Appl. No. 10/498,554, filed Jun. 14, 2004, 2005/0129961, Klaus Deller.
U.S. Appl. No. 10/499,704, filed Dec. 8, 2004, 2005/0103231, Geisselmann et al.
U.S. Pat. No. 7,871,588, Jan. 18, 2011, 2003/0003040, Lindner et al.
U.S. Pat. No. 7,097,818, Aug. 29, 2006, 2005/0137317, Lindner et al.
U.S. Pat. No. 6,702,887, Mar. 9, 2004, 2003/0037706, Uhrlandt et al.
U.S. Pat. No. 6,960,251, Nov. 1, 2005, 2003/0059380, Uhrlandt et al.
U.S. Pat. No. 6,613,309, Sep. 2, 2003, 2003/0068281, Uhrlandt et al.
U.S. Pat. No. 6,899,951, May 31, 2005, 2003/0162881, Panz et al.
U.S. Pat. No. 7,074,457, Jul. 11, 2006, 2003/0130379, Panz et al.
U.S. Pat. No. 7,022,375, Apr. 4, 2006, 2003/0144404, Schachtely et al.
U.S. Pat. No. 7,220,449, May 22, 2007, 2005/0124749, Schachtely et al.
U.S. Pat. No. 6,695,904, Feb. 24, 2004, 2003/0041779, Burger et al.
U.S. Appl. No. 11/058,293, filed Feb. 16, 2005, 2005/0187334, Blume et al.
U.S. Appl. No. 10/527,681, filed Mar. 11, 2005, 2005/0215696, Scholz et al.
U.S. Pat. No. 8,337,794, Dec. 25, 2012, 2009/0176922, Scholz et al.
U.S. Pat. No. 7,563,317, Jul. 21, 2009, 2005/0241531, Meyer et al.
U.S. Appl. No. 10/530,326, filed Apr. 5, 2005, 2006/0292192, Hasenzahl et al.
U.S. Pat. No. 7,563,839, Jul. 21, 2009, 2005/0171268, Scholz et al.
U.S. Pat. No. 7,659,328, Feb. 9, 2010, 2005/0215668, Scholz et al.
U.S. Pat. No. 6,846,865, Jan. 25, 2005 , 2003/0181565, Panz et al.
U.S. Pat. No. 6,956,080, Oct. 18, 2005, 2003/0195290, Scholz et al.
U.S. Pat. No. 6,830,816, Dec. 14, 2004, 2003/0008974, Mehnert et al.
U.S. Pat. No. 7,026,398, Apr. 11, 2006, 2003/0186066, Monkiewicz et al.
U.S. Pat. No. 7,488,382, Feb. 10, 2009, 2004/0047792, Schubert et al.
U.S. Appl. No. 12/342,725, filed Dec. 23, 2008, 2009/0101866, Schubert et al.
U.S. Pat. No. 8,012,253, Sep. 6, 2011, 2010/0288164, Schubert et al.
U.S. Pat. No. 7,303,624, Dec. 4, 2007, 2004/0127604, Meyer et al.
U.S. Pat. No. 7,285,330, Oct. 23, 2007, 2004/0121156, Meyer et al.
U.S. Pat. No. 7,402,293, Jul. 22, 2008, 2004/0120876, Meyer et al.
U.S. Pat. No. 6,794,445, Sep. 21, 2004, 2003/0198819, Reusmann et al.
U.S. Pat. No. 8,022,130, Sep. 20, 2011, 2007/0129480, Nowak et al.
U.S. Pat. No. 7,713,626, May 11, 2010, 2007/0191537, Meyer et al.
U.S. Pat. No. 9,708,458, Jul. 18, 2017, 2007/0173587, Scholz et al.
U.S. Pat. No. 7,790,797, Sep. 7, 2010, 2005/0124731, Blumenschein et al.
U.S. Pat. No. 8,017,098, Sep. 13, 2011, 2006/0093541, Uhrlandt et al.
U.S. Pat. No. 7,790,131, Sep. 7, 2010, 2006/0099129, Stenzel et al.
U.S. Pat. No. 7,628,971, Dec. 8, 2009, 2008/0293871, Stenzel et al.
U.S. Appl. No. 10/523,414, filed Sep. 12, 2005, 2006/0137575, Stenzel et al.
U.S. Pat. No. 7,855,248, Dec. 21, 2010, 2006/0100344, Stenzel et al.
U.S. Pat. No. 8,986,442, Mar. 24, 2015, 2006/0254463, Luginsland et al.
U.S. Pat. No. 8,597,425, Dec. 3, 2013, 2006/0165581, Stenzel et al.
U.S. Pat. No. 9,540,247, Jan. 10, 2017, 2013/0251616, Stenzel et al.
U.S. Appl. No. 11/013,639, filed Dec. 16, 2004, 2005/0136269, Doehler et al.
U.S. Appl. No. 11/780,799, filed Sep. 13, 2007, 2007/0299231, Doehler et al.
U.S. Pat. No. 8,314,039, Nov. 20, 2012, 2005/0118911, Oles et al.
U.S. Appl. No. 11/068,500, filed Feb. 28, 2005, 2005/0192190, Hasenzahl et al.
U.S. Pat. No. 8,524,284, Sep. 3, 2013, 2005/0244513, Lortz et al.
U.S. Pat. No. 8,071,215, Dec. 6, 2011, 2009/0076194, Meyer et al.
U.S. Pat. No. 7,255,735, Aug. 14, 2007, 2006/0144296, Meyer et al.
U.S. Pat. No. 8,007,751, Aug. 30, 2011, 2005/0191228, Panz et al.
U.S. Appl. No. 11/037,118, filed Jan. 19, 2005, 2005/0192395, Panz et al.
U.S. Pat. No. 8,614,256, Dec. 24, 2013, 2011/0172343, Panz et al.
U.S. Pat. No. 7,553,889, Jun. 30, 2009, 2004/0249049, Christian et al.

(56) References Cited

OTHER PUBLICATIONS

U.S. Pat. No. 7,816,442, Oct. 19, 2010, 2008/0139756, Christian et al.
U.S. Pat. No. 7,846,529, Dec. 7, 2010, 2006/0147675, Nun et al.
U.S. Pat. No. 8,420,163, Apr. 16, 2013, 2011/0045247, Nun et al.
U.S. Pat. No. 7,442,666, Oct. 28, 2008, 2006/0041097, Herrwerth et al.
U.S. Pat. No. 8,333,914, Dec. 18, 2012, 2009/0202835, Pitsch et al.
U.S. Pat. No. 6,902,715, Jun. 7, 2005, 2002/0150528, Maus et al.
U.S. Appl. No. 12/091,252, filed Apr. 23, 2008, 2008/0315004, Nagel et al.
U.S. Pat. No. 7,566,433, Jul. 28, 2009, 2007/0059232, Stenzel et al.
U.S. Pat. No. 7,608,234, Oct. 27, 2009, 2007/0100057, Stenzel et al.
U.S. Pat. No. 7,598,334, Oct. 6, 2009, 2006/0155089, Ferenz et al.
U.S. Appl. No. 11/530,562, filed Sep. 11, 2006, 2007/0059539, Doehler et al.
U.S. Pat. No. 7,605,284, Oct. 20, 2009, 2007/0100153, Brueckner et al.
U.S. Appl. No. 11/593,733, filed Nov. 7, 2006, 2007/0123599, Eilbracht et al.
U.S. Pat. No. 7,981,211, Jul. 19, 2011, 2009/0258968, Meyer et al.
U.S. Pat. No. 8,722,838, May 13, 2014, 2009/0292097, Scholz et al.
U.S. Appl. No. 14/138,568, filed Dec. 23, 2013, 2014/0102334, Scholz et al.
U.S. Pat. No. 7,972,431, Jul. 5, 2011, 2010/0022694, Meyer et al.
U.S. Appl. No. 12/375,885, filed Jan. 30, 2009, 2009/0311341, Nagel et al.
U.S. Pat. No. 8,338,528, Dec. 25, 2012, 2010/0168326, Scholz et al.
U.S. Pat. No. 8,835,535, Sep. 16, 2014, 2010/0324173, Fischer et al.
U.S. Pat. No. 7,977,523, Jul. 12, 2011, 2008/0058573, Zanthoff et al.
U.S. Pat. No. 8,680,356, Mar. 25, 2014, 2011/0152596, Zanthoff et al.
U.S. Pat. No. 8,507,033, Aug. 13, 2013, 2010/0233059, Meyer et al.
U.S. Pat. No. 8,512,595, Aug. 20, 2013, 2010/0200803, Meyer et al.
U.S. Pat. No. 8,389,617, Mar. 5, 2013, 2010/0105818, Meyer et al.
U.S. Pat. No. 8,404,774, Mar. 26, 2013, 2010/0179276, Meyer et al.
U.S. Pat. No. 8,163,080, Apr. 24, 2012, 2010/0126387, Meyer et al.
U.S. Appl. No. 13/409,715, filed Mar. 1, 2012, 2012/0152151, Meyer et al.
U.S. Appl. No. 12/599,326, filed Nov. 9, 2009, 2010/0305236, Scholz et al.
U.S. Appl. No. 13/459,925, filed Apr. 30, 2012, 2012/0251707, Scholz et al.
U.S. Pat. No. 8,173,737, May 8, 2012, 2010/0137485, Scholz et al.
U.S. Pat. No. 8,283,040, Oct. 9, 2012, 2010/0093884, Spyrou et al.
U.S. Pat. No. 8,129,314, Mar. 6, 2012, 2007/0191225, Heindl et al.
U.S. Pat. No. 8,617,504, Dec. 31, 2013, 2007/0299203, Panz et al.
U.S. Pat. No. 7,767,180, Aug. 3, 2010, 2007/0286788, Panz et al.
U.S. Pat. No. 7,759,402, Jul. 20, 2010, 2009/0093598, Venzmer et al.
U.S. Pat. No. 7,893,128, Feb. 22, 2011, 2007/0287765, Busch et al.
U.S. Pat. No. 7,964,694, Jun. 21, 2011, 2008/0305065, Ferenz et al.
U.S. Pat. No. 8,030,366, Oct. 4, 2011, 2008/0076842, Ferenz et al.
U.S. Pat. No. 8,034,848, Oct. 11, 2011, 2009/0012197, Landers et al.
U.S. Pat. No. 7,834,122, Nov. 16, 2010, 2008/0027202, Ferenz et al.
U.S. Pat. No. 7,727,599, Jun. 1, 2010, 2008/0064782, Doehler et al.
U.S. Appl. No. 11/677,821, filed Feb. 22, 2007, 2007/0203307, Cavaleiro et al.
U.S. Pat. No. 7,361,777, Apr. 22, 2008, 2007/0190306, Herrwerth et al.
U.S. Pat. No. 8,152,916, Apr. 10, 2012, 2010/0152350, Meyer et al.
U.S. Pat. No. 8,075,862, Dec. 13, 2011, 2010/0168305, Meyer et al.
U.S. Pat. No. 8,293,834, Oct. 23, 2012, 2010/0152349, Meyer et al.
U.S. Appl. No. 12/676,373, filed Mar. 4, 2010, 2010/0203173, Scheffler et al.
U.S. Appl. No. 12/165,735, filed Jul. 1, 2008, 2009/0007483, Hansel et al.
U.S. Appl. No. 12/742,518, filed May 12, 2010, 2010/0261823, Kneisel et al.
U.S. Appl. No. 12/742,258, filed May 11, 2010, 2010/0254876, Kneisel et al.
U.S. Appl. No. 12/670,130, filed Jan. 22, 2010, 2010/0196243, Meyer et al.
U.S. Pat. No. 8,480,846, Jul. 9, 2013, 2010/0286311, Meyer et al.
U.S. Appl. No. 12/196,404, filed Aug. 22, 2008, 2009/0053552, De Gans et al.
U.S. Pat. No. 8,138,372, Mar. 20, 2012, 2009/0054521, Herrwerth et al.
U.S. Appl. No. 12/674,831, filed May 9, 2011, 2011/0206623, Wenk et al.
U.S. Pat. No. 9,738,535, Aug. 22, 2017, 2009/0137732, Panz et al.
U.S. Pat. No. 8,038,788, Oct. 18, 2011, 2010/0236451, Michael et al.
U.S. Pat. No. 8,084,633, Dec. 27, 2011, 2008/0216708, Herrwerth et al.
U.S. Appl. No. 12/996,539, filed Dec. 6, 2010, 2011/0078920, Tschernjaew et al.
U.S. Appl. No. 12/364,283, filed Feb. 2, 2009, 2010/0036011, De Gans et al.
U.S. Appl. No. 12/370,733, filed Feb. 13, 2009, 2010/0210445, von Rymon Lipinski et al.
U.S. Appl. No. 13/855,273, filed Apr. 2, 2013, 2013/0267403, von Rymon Lipinski et al.
U.S. Pat. No. 8,658,816, Feb. 25, 2014, 2011/0021801, Wehmeier et al.
U.S. Pat. No. 8,617,529, Dec. 31, 2013, 2011/0070175, Herrwerth et al.
U.S. Pat. No. 8,466,248, Jun. 18, 2013, 2011/0091399, Meyer et al.
U.S. Appl. No. 12/988,379, filed Oct. 18, 2010, 2011/0071256, Nowak et al.
U.S. Pat. No. 8,211,841, Jul. 3, 2012, 2011/0021398, Allef et al.
U.S. Appl. No. 12/988,638, filed Oct. 20, 2010, 2011/0045723, Nowak et al.
U.S. Appl. No. 12/536,146, filed Aug. 5, 2009, 2010/0034765, Herrwerth et al.
U.S. Pat. No. 8,172,936, May 8, 2012, 2010/0031852, Herrwerth et al.
U.S. Pat. No. 8,962,519, Feb. 24, 2015, 2011/0136919, Heindl et al.
U.S. Appl. No. 13/121,758, filed Mar. 30, 2011, 2011/0182796, Lang et al.
U.S. Pat. No. 8,211,972, Jul. 3, 2012, 2010/0081763, Meyer et al.
U.S. Appl. No. 13/121,754, filed Jun. 8, 2011, 2011/0236288, Panz et al.
U.S. Appl. No. 13/121,751, filed Jun. 8, 2011, 2011/0244238, Panz et al.
U.S. Appl. No. 13/128,442, filed, May 10, 2011, 2011/0214425, Lang et al.
U.S. Appl. No. 13/132,166, filed Jun. 1, 2011, 2011/0236291, Lang et al.
U.S. Appl. No. 13/580,194, filed Aug. 21, 2012, 2012/0321803, Borup et al.
U.S. Pat. No. 9,388,314, Jul. 12, 2016, 2011/0039983, Uwe Dietrich Kuehner.
U.S. Pat. No. 8,211,995, Jul. 3, 2012, 2010/0197854, Kühner et al.
U.S. Appl. No. 13/202,512, filed Aug. 19, 2011, 2011/0302849, Stenner et al.
U.S. Pat. No. 8,642,525, Feb. 4, 2014, 2012/0015893, Herrwerth et al.
U.S. Pat. No. 8,685,376, Apr. 1, 2014, 2010/0266651, Czech et al.
U.S. Appl. No. 13/260,657, filed Sep. 27, 2011, 2012/0021960, Wenk et al.
U.S. Pat. No. 8,841,400, Sep. 23, 2014, 2012/0027704, Henning et al.
U.S. Pat. No. 8,092,587, Jan. 10, 2012, 2011/0179970, Zschunke et al.
U.S. Pat. No. 10,752,510, Aug. 25, 2020, 2012/0322893, Drexel et al.
U.S. Pat. No. 8,772,423, Jul. 8, 2014, 2012/0071564, De Gans et al.
U.S. Pat. No. 8,268,939, Sep. 18, 2012, 2010/0184913, Ebbrecht et al.

(56) References Cited

OTHER PUBLICATIONS

U.S. Pat. No. 8,933,164, Jan. 13, 2015, 2012/0114865, Peggau et al.
U.S. Pat. No. 8,778,319, Jul. 15, 2014, 2012/0294819, Herrwerth et al.
U.S. Pat. No. 9,200,216, Dec. 1, 2015, 2013/0030233, Boeing et al.
U.S. Pat. No. 8,779,031, Jul. 15, 2014, 2011/0112219, Schachtely et al.
U.S. Pat. No. 8,993,093, Mar. 31, 2015, 2013/0008585, Hasskerl et al.
U.S. Pat. No. 8,247,525, Aug. 21, 2012, 2011/0281973, Schubert et al.
U.S. Pat. No. 9,073,818, Jul. 7, 2015, 2013/0078208, Herrwerth et al.
U.S. Appl. No. 13/701,737, filed Dec. 3, 2012, 2013/0071343, Herrwerth et al.
U.S. Pat. No. 10,065,865, Sep. 4, 2018, 2014/0042359, Fuhrmann et al.
U.S. Pat. No. 9,616,007, Apr. 11, 2017, 2013/0171087, Herrwerth et al.
U.S. Appl. No. 13/992,311, filed Jun. 7, 2013, 2013/0259821, Henning et al.
U.S. Appl. No. 14/001,382, filed Aug. 23, 2013, 2013/0331592, Hartung et al.
U.S. Pat. No. 10,106,426, Oct. 23, 2018, 2016/0207785, Panz et al.
U.S. Pat. No. 9,138,385, Sep. 22, 2015, 2014/0134125, Dahl et al.
U.S. Pat. No. 9,784,402, Oct. 10, 2017, 2015/0204477, Menzel et al.
U.S. Pat. No. 9,926,451, Mar. 27, 2018, 2016/0326374, Blume et al.
U.S. Pat. No. 9,233,986, Jan. 12, 2016, 2014/0150242, Kratel et al.
U.S. Pat. No. 8,993,792, Mar. 31, 2015, 2013/0204021, Hartung et al.
U.S. Appl. No. 14/410,385, filed Oct. 21, 2015, 2016/0082415, Drexel et al.
U.S. Pat. No. 9,796,876, Oct. 24, 2017, 2015/0191625, Lomoelder et al.
U.S. Pat. No. 11,123,765, Sep. 21, 2021, 2016/0151805, Scheffler et al.
U.S. Pat. No. 9,663,622, May 30, 2017, 2016/0185918, Hinzmann et al.
U.S. Pat. No. 9,617,390, Apr. 11, 2017, 2016/0222169, Hinzmann et al.
U.S. Pat. No. 10,626,291, Apr. 21, 2020, 2016/0108280, Hallack et al.
U.S. Appl. 14/772,019, filed Sep. 1, 2015, 2016/0017165, Numrich et al.
U.S. Pat. No. 9,353,289, May 31, 2016, 2015/0073069, De Gans et al.
U.S. Pat. No. 9,221,945, Dec. 29, 2015, 2015/0094419, Alzer et al.
U.S. Pat. No. 9,266,825, Feb. 23, 2016, 2015/0225337, Lomoelder et al.
U.S. Pat. No. 10,280,088, May 7, 2019, 2016/0107895, Schulze Isfort et al.
U.S. Pat. No. 11,242,259, Feb. 8, 2022, 2019/0161355, Schulze Isfort et al.
U.S. Pat. No. 10,239,898, Mar. 26, 2019, 2018/0179234, Hallack et al.
U.S. Pat. No. 9,902,095, Feb. 27, 2018, 2015/0321392, Stapperfenne et al.
U.S. Pat. No. 9,902,096, Feb. 27, 2018, 2015/0321393, Stapperfenne et al.
U.S. Pat. No. 10,618,849, Apr. 14, 2020, 2017/0233297, Albinus et al.
U.S. Appl. No. 15/510,282, filed Mar. 10, 2017, 2017/0298250, Anselmann et al.
U.S. Pat. No. 10,100,207, Oct. 16, 2018, 2016/0297974, Stache et al.
U.S. Pat. No. 10,179,751, Jan. 15, 2019, 2018/0065892, Geisler et al.
U.S. Pat. No. 10,308,820, Jun. 4, 2019, 2018/0100071, Duerr et al.
U.S. Pat. No. 10,723,628, Jul. 28, 2020, 2019/0106328, Lortz et al.
U.S. Pat. No. 10,633,555, Apr. 28, 2020, 2019/0048224, Stache et al.
U.S. Pat. No. 11,254,896, Feb. 22, 2022, 2019/0031977, Kuppert et al.
U.S. Appl. No. 16/339,081, filed Apr. 3, 2019, 2019/0276358, Schultz et al.
U.S. Appl. No. 16/478,169, filed Jul. 16, 2019, 2020/0031720, Geisler et al.
U.S. Appl. No. 16/628,664, filed Jan. 4, 2020, 2020/0140282, Erz et al.
U.S. Appl. No. 16/608,316, filed Oct. 25, 2019, 2021/0102091, Albert et al.
U.S. Pat. No. 11,021,608, Jun. 1, 2021, 2019/0241741, Seyfried et al.
U.S. Pat. No. 11,352,510, Jun. 7, 2022, 2019/0106581, Michael et al.
U.S. Appl. No. 17/260,371, filed Jan. 14, 2021, 2021/0292238, Albinus et al.
U.S. Appl. No. 17/414,497, filed Jun. 16, 2021, 2022/0073765, Hinrichs et al.
U.S. Pat. No. 11,267,975, Mar. 8, 2022, 2022/0041869, Michael et al.
U.S. Appl. No. 16/834,781, filed Mar. 30, 2020, 2020/0308406 Seyfried et al.
U.S. Appl. No. 17/126,172, filed Dec. 18, 2020, 2021/0206972, Schulz et al.
U.S. Appl. No. 17/176,922, filed Feb. 16, 2021, 2021/0253889, Schulte et al.
U.S. Appl. No. 17/190,919, filed Mar. 3, 2021, 2021/0277257, Roland et al.
U.S. Pat. No. 11,254,819, Feb. 22, 2022, 2021/0122921, Hallack et al.
U.S. Appl. No. 17/355,385, filed Jun. 23, 2021, 2021/0403753, Schulte et al.

\* cited by examiner

USE OF SILICON DIOXIDE FOR IMPROVING THE CATHODIC ANTICORROSION EFFECT OF GROUND COATS

CROSS-REFERENCE TO RELATED APPLICATIONS

This application claims priority to European Patent Application No. 20190611.2, filed Aug. 12, 2020, the content of which is hereby incorporated by reference in its entirety.

BACKGROUND OF THE INVENTION

Field of the Invention

The invention relates to the use of silicon dioxide for improving the cathodic anticorrosion effect of ground coats.

Description of Related Art

To protect metal surfaces/substrates, for example iron and steel, from corrosion, these are treated with a functional coating well known in the art. This functional coating, also known as a primer coat or else primer for short, is applied directly to a metal substrate in order to assume in a coating system a certain function as a ground coat, in particular for adhesion promotion and for anticorrosion purposes. Said coating generally contains metal particles, in particular zinc and/or aluminium particles, as so-called sacrificial metal. Further coating layers are typically applied to the ground coat to even more effectively protect metal surfaces/substrates from corrosion.

The functional coating may be used not only as a ground coat or primer coat but also as the only anticorrosion coating on high-strength metal screws, nuts, springs, metal sheets and/or other construction parts. Such anticorrosion coatings are also referred to as zinc flake coating.

Metal particles or pigments of a specific metal are to be understood as being synonymous.

The terms ground coat, functional coating, primer and primer coat are to be understood as being synonymous.

The anticorrosive effect of the ground coat/functional coating is attributable to the cathodic protective effect of the metal pigment. Zinc-containing ground coats used especially for protection of machines and steel constructions in the automotive sector, in bridge building and in shipbuilding have proven particularly advantageous. As a result of electrical contact between the zinc particles among themselves and the substrate, the latter is cathodically protected. The substrate functions as a cathode while the zinc particles are anodically oxidized and dissolve. Absorbed water promotes the removal of zinc ions through the ground coat. Reaction with oxygen or carbon dioxide can ultimately result in the formation of insoluble zinc salts which can trap small defects in the coating layer.

Epoxy resins are typically used as binders for ground coats on account of their good barrier effect, good substrate adhesion and good mechanical properties.

To counter sedimentation of the metal particles and improve the storage stability of the ground coats, small amounts of thixotropic additives are often added. Known thixotropic additives include organically modified argillaceous earths and pyrogenic silicas.

Publicly funded projects to overcome limitations to the effectiveness of zinc primers are known from the prior art. Various approaches have been tested:

modification of particle size distribution and particle shape of the zinc pigments,
use of zinc alloy pigments or
addition of zinc-free corrosion-inhibiting pigments or
addition of graphene.
All of these approaches are time- and cost-intensive.

It is therefore desirable to identify substances which improve the cathodic anticorrosion effect of ground coats.

Since the anticorrosion activity of the metal is based substantially on the electrical contact thereof with the substrate, a good anticorrosion effect shall be sought by improving the conductivity in the coating. Corrosive processes ultimately require mobility/exchange of charge carriers, specifically of ions and electrons. Electrons are mobile in the metal and ions are mobile in ion-conducting phases. This simultaneously that the corroding metal must be located in an electrolyte, for example water as an ion-conducting liquid.

SUMMARY OF THE INVENTION

It has surprisingly been found that the use of silicon dioxide is suitable for improving the cathodic anticorrosion effect of ground coats, preferably of zinc primers, based on epoxy-functional polymers and at least one metal particle.

The invention also includes the following embodiments:

1. Use of silicon dioxide for improving the cathodic anticorrosion effect of ground coats, preferably of a zinc primer, based on epoxy-functional polymers and at least one metal particle.
2. Use according to embodiment 1, characterized in that the silicon dioxide is pyrogenic silicon dioxide, preferably selected from hydrophilic, hydrophobic and/or semihydrophobic pyrogenic silicon dioxides.
3. Use according to either of the preceding embodiments, characterized in that the silicon dioxide, preferably silicon dioxide particles, has a surface modification with silanes selected from dimethyldichlorosilane, trimethoxy-i-butylsilane, trimethoxyoctylsilane, trimethoxyhexadecylsilane, octyltriethoxysilane, silazanes selected from 1,1,1-trimethyl-N-(trimethylsilyl)silanamine and N-methyl-aza-2,2,4-trimethylsilacyclopentane or siloxanes selected from octamethyltetracyclosiloxane, decamethylpentacyclosiloxane or polydimethylsiloxane or combinations thereof.
4. Use according to any of the preceding embodiments, characterized in that the pyrogenic silicon dioxide particles have a BET surface area of 20 $m^2/g$-1000 $m^2/g$, preferably 50 $m^2/g$-500 $m^2/g$, determined according to DIN 9277:2014 by nitrogen adsorption in accordance with the Brunauer-Emmett-Teller method.
5. Use according to any of the preceding embodiments, characterized in that the silicon dioxide is employed in an amount of 0.01-15% by weight, preferably 0.05-5% by weight, particularly preferably 0.1-3% by weight, based on the total amount of the functional coating.
6. Use according to any of the preceding embodiments, characterized in that the metal particles are selected from zinc, magnesium, aluminium, chromium, silicon or manganese, alloys thereof or mixtures thereof.
7. Use according to any of the preceding embodiments, characterized in that the zinc primer contains zinc dust or zinc flakes.
8. Use according to any of the preceding embodiments, characterized in that the zinc primer comprises a binder system based on an epoxy resin selected from bisphenol A glycidyl ether, bisphenol F glycidyl ether, novolac-based epoxy resins or mixtures thereof.
9. Use according to any of the preceding embodiments, characterized in that the functional coating comprises a curing agent preferably selected from the group of aliphatic, cycloaliphatic and aromatic amines and polyamides or amidoamines based thereon.

DETAILED DESCRIPTION OF THE INVENTION

Figure 1:
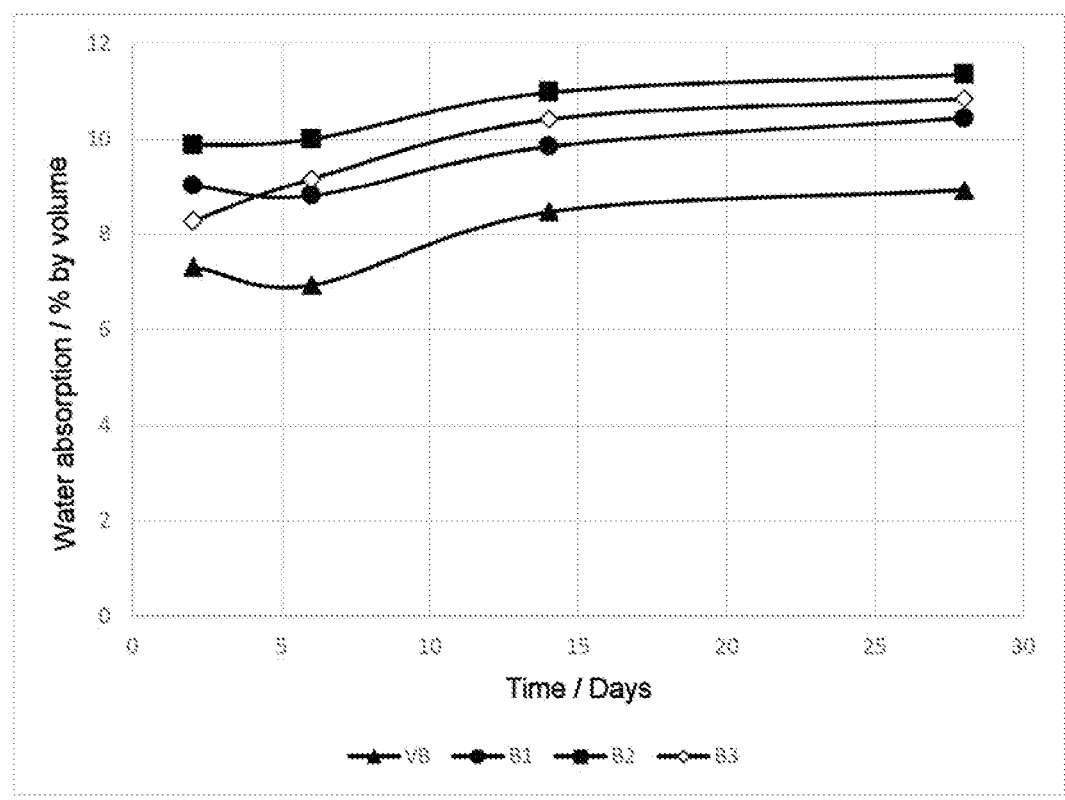
FIG. 1 shows a graph of water absorption of coated metal sheets B1-B3 and VB.

Ground coats and functional coatings are used synonymously here.

It is thought that the elevated ionic conductivity improves the cathodic anticorrosion effect of metal particle-containing functional coatings.

It is further thought that the elevated ionic conductivity is attributable to the elevated water absorption of the coating. A direct impedance measurement of the ground coat according to the invention is not possible in any results-relevant way due to the presence of metal particles, preferably zinc dust.

For this reason, an indirect measurement of the water absorption/conductivity of a cured coating based on epoxy-functional polymers as binders was performed without metal particles, preferably without zinc dust.

It has been found that the water absorption of the cured coating without metal particles was elevated, as was conductivity. Reference is made here to the examples.

It is therefore possible to draw the conclusion that the ground coats according to the invention likewise exhibit elevated water absorption and correspondingly also an improved ionic conductivity, thus resulting in an improved cathodic anticorrosion effect.

The silicon dioxide is preferably pyrogenic silicon dioxide.

These are preferably selected from hydrophilic, hydrophobic and/or semihydrophobic pyrogenic silicon dioxides.

The term "hydrophilic" in the context of the present invention refers to particles which can be fully wetted with pure water. Hydrophobic particles cannot be wetted by pure water; they therefore have water-repellent properties. Such hydrophobicity may typically be achieved by application of appropriate nonpolar groups to the silica surface. The extent of the hydrophobicity of a silica may be determined via parameters including its Corning Glass methanol wettability, as more particularly described in WO2011/076518 A1, pages 5-6, for example. In pure water a completely hydrophobized silica separates from the aqueous phase and floats on the surface thereof without being wetted. By contrast, in pure methanol a hydrophobic silica may be wetted by shaking/vigorous stirring and thus homogeneously distributed in the solvent volume. Measurement of methanol wettability determines the maximum content of methanol in a methanol-water test mixture at which there is still no wetting of the silica, i.e. after contact with the test mixture ideally 100% of the employed silica remains unwetted and separates. This content of methanol in the methanol-water mixture in % by volume is called methanol wettability. The higher such a methanol wettability, the more hydrophobic the silica. The lower the methanol wettability, the lower the hydrophobicity.

The hydrophilic silicon dioxide according to the invention preferably has a methanol wettability of 0% by volume methanol in a methanol-water mixture. The silica is therefore completely wetted by pure water.

The hydrophobic silicon dioxide according to the invention preferably has a methanol wettability of >0% by volume methanol in a methanol-water mixture, preferably between 5-90% by volume methanol in a methanol-water mixture, particularly preferably between 20-75% by volume methanol in a methanol-water mixture.

Silica and silicon dioxide are to be understood as being synonymous.

It was moreover surprising that both the coatings based on epoxy-functional polymers containing hydrophilic silicon dioxides and the coatings based on epoxy-functional polymers containing hydrophobic silicon dioxides exhibit elevated water absorption and elevated conductivity compared to a coating without silicon dioxide.

The silicon dioxide is preferably employed in powder form. Naturally, silicon dioxide in dispersed form is generally also suitable.

Structurally modified AEROSIL® types (for example AEROSIL® R 9200), obtainable from Evonik, were introduced more than 10 years ago to improve the scratch resistance and mechanical strength of products of the coatings and adhesives/sealants industries.

It is conceivable that all structurally modified silicon dioxide types are generally suitable for the use according to the invention.

The silicon dioxide particles preferably have a surface modification with silanes selected from dimethyldichlorosilane, trimethylmonochlorosilane, methyltrichlorosilane, propyltrichlorosilane, trimethoxypropylsilane, triethoxypropylsilane, trimethoxy-i-butylsilane, triethoxy-i-butylsilane, trimethoxyoctylsilane, triethoxyoctylsilane, trimethoxyhexadecylsilane, octyltriethoxysilane and triethoxyhexadecylsilane, silazanes selected from 1,1,1-trimethyl-N-(trimethylsilyl)silanamine and N-methyl-aza-2,2,4-trimethylsilacyclopentane or siloxanes selected from octamethyltetracyclosiloxane, decamethylpentacyclosiloxane, dodecamethylhexacyclosiloxane, polydimethylsiloxane, methoxy- and hydroxy-terminated polydimethylsiloxane or combinations thereof. Such surface-modified silicon dioxide particles are obtainable for example under the designations Aerosil® (Evonik), Cab-o-sil® (Cabot) or HDK (Wacker).

The silicon dioxide particles preferably have a numerical average primary particle size between 2-100 nm, preferably 5-50 nm. A numerical average particle size may be determined by electron microscopy.

It is preferable when the silicon dioxide particles have a BET surface area of 20-1000 $m^2/g$, preferably 50-500 $m^2/g$. The specific surface area, also referred to simply as BET surface area, is determined according to DIN 9277:2014 by nitrogen adsorption in accordance with the Brunauer-Emmett-Teller method.

The silicon dioxide employed for use according to the invention may have a tamped density of up to 400 g/L, preferably of 10 to 100 g/L, particularly preferably of 20 to 80 g/L, very particularly preferably 30 to 70 g/L. Tamped densities of various pulverulent or coarse-grain granular materials may be determined according to DIN ISO 787-11:1995 "General methods of testing for pigments and extenders—Part 11: Determination of tamped volume and apparent density after tamping". This involves measuring the bulk density of a bulk material after agitation and tamping.

The silicon dioxide is preferably employed in an amount of 0.01-15% by weight, preferably 0.05-5% by weight, particularly preferably 0.1-3% by weight, based on the total amount of the functional coating.

Preferred metal particles are selected from zinc, magnesium, aluminium, chromium, silicon or manganese, alloys thereof or mixtures thereof.

It is preferable when the functional coating is a ground coat, preferably a zinc primer.

The zinc primer preferably contains zinc dust or zinc flakes.

The zinc primer and the ground coat preferably comprise a binder system based on an epoxy resin selected from bisphenol A diglycidyl ether and oligomers thereof, partly or fully hydrogenated bisphenol A diglycidyl ether and oligomers thereof, brominated bisphenol A diglycidyl ether and oligomers thereof, bisphenol F diglycidyl ether and oligomers thereof, partly or fully hydrogenated bisphenol F diglycidyl ether and oligomers thereof, bisphenol S diglycidyl ether and oligomers thereof, novolac-based epoxy resins such as for example epoxy phenol novolac (EPN) or epoxy cresol novolac (ECN), hydrogenated novolac-based epoxy resins, condensates of any of the abovementioned epoxy resins with silicone resins, or mixtures thereof. Such epoxy resins are available for example under the designations Epikote and Eponex (Hexion), Araldite (Huntsman), Silikopon (Evonik) or D.E.R. (Dow Chemical).

The zinc primer preferably contains bisphenol A diglycidyl ether or oligomers thereof.

The ground coat or the zinc primer may in addition comprise a curing agent. Suitable curing agents in principle include all curing agents capable of curing the epoxy-functional polymer.

The curing agents are preferably selected from the group of acid anhydrides, from the group of (poly)thiols, aminosilanes, (poly)isocyanates, aliphatic, cycloaliphatic and aromatic amines, Mannich base derivatives of an aliphatic, cycloaliphatic or aromatic amine, phenalkamines, polyamides or amidoamines based on an aliphatic, cycloaliphatic or aromatic amine and poly(alkylene oxide) diamines or triamines. Such curing agents are obtainable for example under the designations Ancamine and Ancamide (Evonik), Aradur and Jeffamine (Huntsman), Epikure (Hexion) or D.E.H. (Dow Chemical).

The functional coating or the zinc primer may also comprise further additives selected from reactive diluents, for example monoglycidyl ethers, organic solvents, for example xylene, catalysts or accelerators, for example ternary amines, defoamers, flow auxiliaries and fillers, for example talc or quartz flour.

The examples which follow serve merely to elucidate this invention to those skilled in the art and do not constitute any limitation of the described use whatsoever.

Methods

Impedance Measurements

Impedance measurements were performed based on DIN EN ISO 16773-1 to -4 "Electrochemical impedance spectroscopy (EIS) of coated and uncoated specimens" using an IM6 electrochemical measurement system in combination with an AMZ60 measurement cell and Thales XT Version 5.3.0 software from ZAHNER-Elektrik. The measurement cell contains a Plexiglas cylinder (o 33.8 mm), filled with 3% by weight NaCl solution. A 3-electrode configuration was used with a stainless steel rod as the counterelectrode and an MF-2052 RE-5B Ag/AgCl/3M NaCl reference electrode from BASi. The impedance spectrum was measured with an amplitude of 10 mV in the frequency range 1 Hz-100 kHz, namely after half an hour and after 2, 6, 14 and 28 days. During measurement the measurement cell was located in a Faraday cage connected to the earth connection of the electrochemical measurement system. Between measurements the metal sheets were likewise stored in a 3% by weight NaCl solution. The temperature in the laboratory was 20° C. and the atmospheric humidity was 30%.

The capacitance C of the coating was calculated using the measured impedance |Z| and phase angle φ at a frequency f of 10 kHz as described in Progress in Organic Coatings 2018 vol. 124, pages 249-255. The following equation was used:

$$C = -\sin\varphi / 2\pi f |Z|$$

The volume fraction of water $\phi_{v,water}$ in the coating at a time t was calculated with a modified Brasher-Kingsbury equation as likewise described in Progress in Organic Coatings 2018 vol. 124, pages 249-255:

$$\phi_{v,water} = (\log \varepsilon_w)^{-1}(1-\phi_{v,sil})\log(C(t)d(0)/C(0)d(t))$$

where $\phi_{v,sil}$ is the volume fraction of silicon dioxide in the coating, $\varepsilon_w$ is the relative dielectric constant of water and d(t) is the film thickness. Due to the adsorption of water the film thickness is not constant but rather increases with time t. Film thickness was measured immediately before each impedance measurement at the same location using a Fischer Byko-test MPOR film thickness gauge. The film thickness was taken to be the average of 6 measurements. The present calculations assume a volume fraction of silica of 1.0% and a relative dielectric constant of 80.1 (source: CRC Handbook of Chemistry and Physics, 58th edition, editor Robert C. Weast, CRC Press, page E-61). C(0) is the capacitance at time t=0. To calculate C(0) the impedance at 10 kHz was taken after half an hour.

The ionic conductivity of a coating may likewise be determined by means of impedance spectroscopy. As described in DIN EN ISO 16773-4 the measured impedance spectrum may be adapted with a Randles equivalent circuit. This gives the ohmic resistance $R_p$ of the respective coating. The procedure was performed with the aid of Thales XT Version 5.3.0 software. The ohmic resistance is multiplied by the magnitude of the measured surface area A and divided by the film thickness d at the particular time to make it independent of both. The electrical conductivity K of the coating material is the inversion thereof, as follows:

$$\kappa = \left(\frac{R_p A}{d}\right)^{-1}$$

The measured surface area A is the internal surface area of the Plexiglas cylinder, 8.93 cm$^2$.

Salt Spray Test

Salt spray tests were performed based on ASTM 8117 using a Q-Fog salt spray chamber from Q-Lab. Assessment of the metal sheets was carried out according to DIN EN ISO 4628-2 (blistering), -3 (rusting) and -4 (cracking).

Materials and Equipment

Epikote® Resin 828, Hexion (bisphenol A diglycidyl ether oligomer)

AEROSIL® 200, Evonik Industries

AEROSIL® R972, Evonik Industries

AEROSIL® R974, Evonik Industries

Aradur® 450 BD, Huntsman (polyamidoamine curing agent)

Super extra Zn dust, EverZinc
n-butyl acetate, Reininghaus Chemie
BioXtra sodium chloride, ≥99.5%, Sigma Aldrich
IM6 electrochemical measurement system, ZAHNER-Elektrik
AMZ-60 measurement cell, ZAHNER-Elektrik
MF-2052 RE-5B Reference electrode, BASi
Aluminium sheets, 3"×6", Q-Lab
Q-Fog salt spray chamber, Q-Lab
Byko-test MPOR film thickness gauge, Fischer

EXAMPLES

1. Production of Cured Coatings Based on Epoxy-Functional Polymers as Binders According to the information in table 1 (quantities reported in parts by weight) first the epoxy resin Epikote® 828 was initially charged in a 180 mL PE beaker. Subsequently n-butyl acetate was added with stirring at 2000 rpm using a VMA Getzmann Dispermat and the mixture was homogenized at 2000 rpm for a further 3 minutes. Subsequently Aerosil was added and the mixture was likewise homogenized at 2000 rpm for 3 minutes. Finally, Aradur® 450 BD was added with stirring at 2000 rpm and the mixture was homogenized at 2000 rpm for 3 minutes.

The semi-inventive coating compositions B1-B3 and the comparative example without silicon dioxide VB were immediately after production each applied to three steel sheets from Q-Labs using a 100 μm wire-wound film applicator. The altogether 12 metal sheets were subsequently cured at room temperature for 7 days. The film thickness was about 70 μm.

TABLE 1

Composition of cured coatings based on epoxy-functional polymers.

|  | VB | B1 | B2 | B3 |
| --- | --- | --- | --- | --- |
| Epikote ® 828 | 80 | 80 | 80 | 80 |
| Aerosil ® 200 | — | 2 | — | — |
| Aerosil ® R972 | — | — | 2 | — |
| Aerosil ® R974 | — | — | — | 2 |
| n-butyl acetate | 18 | 18 | 18 | 18 |
| Aradur ® 450 BD | 49.4 | 49.4 | 49.4 | 49.4 |

2. Determination of Water Absorption

The impedance spectrum of the coated metal sheets B1-B3 and VB were measured as described above. The volume fraction of water $\phi_{v,water}$ in the cured coatings at the recited times t was calculated according to the abovementioned formula.

The result is shown in FIG. 1. The values are averages for 3 different metal sheets which were all measured three times in total. It was demonstrated that the addition of silicon dioxide results in an increase in water absorption. The comparative example has only a relatively small water proportion.

3. Determination of Conductivity

Figure 2:
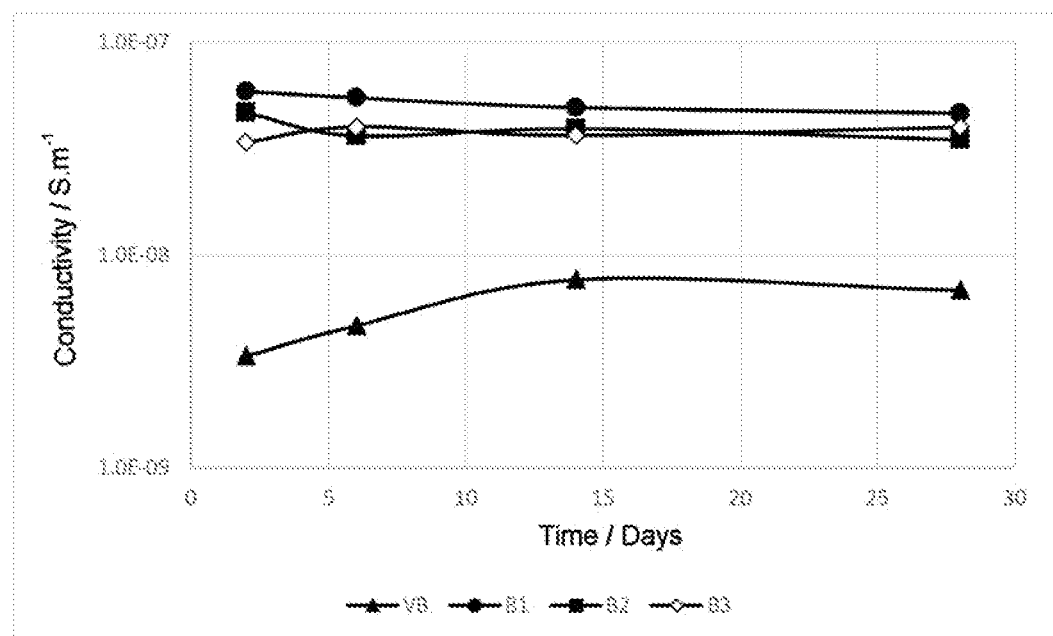
FIG. 2 shows a graph of conductivity of coated metal sheets B1-B3 and VB.

The impedance spectrum of the coated metal sheets B1-B3 and VB was used to calculate the conductivity thereof according to the abovementioned formula. The result is shown in FIG. 2. The numbers are averages for 3 metal sheets which were all measured three times in total. Addition of silicon dioxide made it possible to determine that in contrast to a coating without silicon dioxide (VB) the semi-inventive coatings exhibit an elevated ionic conductivity.

4. Production of Zinc Primers According to the Invention

The zinc primers according to the invention ZP1-ZP3 were produced as per table 2 (the reported amounts are in parts by weight) with the proviso that the zinc dust was together with the Aerosil added to the butyl acetate-diluted Epikote® 828 and the mixture homogenized at 2000 rpm for 3 minutes. Finally, Aradur® 450 BD was added with stirring at 2000 rpm and the mixture was homogenized at 2000 rpm for 3 minutes.

TABLE 2

Composition of the zinc primer.
All reported amounts in parts by weight.

| Zinc primer | VZP | ZP1 | ZP2 | ZP3 |
| --- | --- | --- | --- | --- |
| Epikote ® 828 | 17 | 17 | 17 | 17 |
| Aerosil ® 200 | — | 2 | — | — |
| Aerosil ® R972 | — | — | 2 | — |
| Aerosil ® R974 | — | — | — | 2 |
| n-Butyl acetate | 16 | 16 | 16 | 16 |
| Aradur ® 450 BD | 10.5 | 10.5 | 10.5 | 10.5 |
| Zinc dust | 65 | 65 | 65 | 65 |

The zinc primers ZP1-ZP3 and the comparative example without silicon dioxide VZP were immediately after production each applied to two steel sheets from Q-Labs using a 100 μm wire-wound film applicator. The altogether 8 metal sheets were subsequently cured at room temperature for 7 days.

5. Salt Spray Test

In each case two metal sheets with the applied zinc primer VZP, ZP1-ZP3 from example 2 were investigated. These were subjected to weathering in the salt spray chamber for 1500 hours. The result is the average for the two metal sheets. Blister extent and size, rust extent and crack extent were assessed according to DIN EN ISO 4628 and reported in table 3.

It is apparent that the increase in water content and the increase in conductivity as a result of the addition of silicon dioxide is associated with reduced blistering, rusting and cracking. It has been demonstrated that the cathodic anticorrosion effect of the zinc primer was improved through the use of silicon dioxide.

TABLE 3

Evaluation of salt spray test

| Primer | VZP | ZP1 | ZP2 | ZP3 |
| --- | --- | --- | --- | --- |
| Blister extent | 5 (S5) | 3 (S2) | 3 (S2) | 3 (S2) |
| Rust extent | 3 | 1 | 1 | 1 |
| Crack extent | 1 | 0 | 0 | 0 |

The invention claimed is:
1. A method of improving a cathodic anticorrosion effect of a functional coating based on epoxy-functional polymers and at least one metal particle, the method comprising
incorporating silicon dioxide into the functional coating, wherein the silicon dioxide consists of pyrogenic silicon dioxide,
wherein said pyrogenic silicon dioxide particles have a tamped density of 10-100 g/L, a numerical average particle size of 50 to 100 nm, and a BET surface area of 20 m$^2$/g-1000 m$^2$/g, determined according to DIN 9277:2014 by nitrogen adsorption in accordance with the Brunauer-Emmett-Teller method, and the functional coating comprises at least one curing agent selected from the group consisting of aliphatic, cycloaliphatic, and aromatic amines; aliphatic, cycloaliphatic, and aromatic polyamides; and amidoamines based thereon.

2. The method according to claim 1, wherein the silicon dioxide has a surface modification with a compound selected from the group consisting of dimethyldichlorosilane, trimethoxy-i-butylsilane, trimethoxyoctylsilane, trimethoxyhexadecylsilane, octyltriethoxysilane, 1,1,1-trimethyl-N-(trimethylsilyl) silanamine, N-methyl-aza-2,2,4-trimethylsilacyclopentane, octamethyltetracyclosiloxane, decamethylpentacyclosiloxane, polydimethylsiloxane, and a combination thereof.

3. The method according to claim 1, wherein the silicon dioxide is employed in an amount of 0.01-15% by weight, based on a total amount of the functional coating.

4. The method according to claim 1, wherein the at least one metal particle is selected from the group consisting of zinc, magnesium, aluminum, chromium, silicon, manganese, alloys thereof, and mixtures thereof.

5. The method according to claim 1, wherein the functional coating is a zinc primer which contains zinc dust or zinc flakes.

6. The method according to claim 1, wherein the functional coating is a zinc primer which comprises a binder system based on an epoxy resin selected from the group consisting of bisphenol A glycidyl ether, bisphenol F glycidyl ether, novolac-based epoxy resin, and mixtures thereof.

7. The method according to claim 1, wherein the functional coating is a zinc primer.

8. The method according to claim 1, wherein the pyrogenic silicon dioxide is a hydrophilic pyrogenic silicon dioxide, hydrophobic pyrogenic silicon dioxide, and/or a semihydrophobic pyrogenic silicon dioxide.

9. The method according to claim 2, wherein the silicon dioxide is in the form of silicon dioxide particles.

10. The method according to claim 1, wherein the pyrogenic silicon dioxide particles have a BET surface area of 50 $m^2/g$-500 $m^2/g$.

11. The method according to claim 3, wherein the silicon dioxide is employed in an amount of 0.1-3% by weight, based on the total amount of the functional coating.

12. The method according to claim 1, wherein said pyrogenic silicon dioxide particles have a tamped density of 10-100 g/L.

13. The method according to claim 1, wherein said pyrogenic silicon dioxide particles have a tamped density of 70-400 g/l.

14. The method according to claim 1, wherein said pyrogenic silicon dioxide particles have a BET surface area of 500 $m^2/g$-1,000 $m^2/g$.

15. A method of improving a cathodic anticorrosion effect of a functional coating based on epoxy-functional polymers and at least one metal particle, the method comprising:
incorporating silicon dioxide into the functional coating, wherein the silicon dioxide consists of pyrogenic silicon dioxide,
wherein said pyrogenic silicon dioxide particles have any of a tamped density of 70-400 g/L, a numerical average particle size of 50 to 100 nm, or a BET surface area of 500 $m^2/g$-1,000 $m^2/g$, determined according to DIN 9277:2014 by nitrogen adsorption in accordance with the Brunauer-Emmett-Teller method, and
the functional coating comprises at least one curing agent selected from the group consisting of aliphatic, cycloaliphatic, and aromatic amines; aliphatic, cycloaliphatic, and aromatic polyamides; and amidoamines based thereon.

\* \* \* \* \*